(12) United States Patent
Bowden et al.

(10) Patent No.: US 12,457,120 B2
(45) Date of Patent: Oct. 28, 2025

(54) GENERATING KNOWLEDGE GRAPHS USING DISTRIBUTED LEDGER TECHNOLOGIES

(71) Applicant: Dell Products L.P., Round Rock, TX (US)

(72) Inventors: David Andrew Bowden, Cork (IE); Ahmed Khalid, Cork (IE)

(73) Assignee: DELL PRODUCTS L.P., Round Rock, TX (US)

( * ) Notice: Subject to any disclaimer, the term of this patent is extended or adjusted under 35 U.S.C. 154(b) by 212 days.

(21) Appl. No.: 18/338,121

(22) Filed: Jun. 20, 2023

(65) Prior Publication Data

US 2024/0223387 A1 Jul. 4, 2024

Related U.S. Application Data

(60) Provisional application No. 63/436,964, filed on Jan. 4, 2023.

(51) Int. Cl.
*H04L 9/00* (2022.01)
*H04L 9/32* (2006.01)

(52) U.S. Cl.
CPC .............. *H04L 9/50* (2022.05); *H04L 9/3297* (2013.01)

(58) Field of Classification Search
CPC ................................ H04L 9/50; H04L 9/3297
See application file for complete search history.

(56) References Cited

U.S. PATENT DOCUMENTS

2020/0374106 A1\* 11/2020 Padmanabhan ....... H04L 63/105
2024/0243934 A1\* 7/2024 Moreau ................ G06Q 20/363

\* cited by examiner

*Primary Examiner* — Azizul Choudhury
(74) *Attorney, Agent, or Firm* — Chamberlain, Hrdlicka, White, Williams & Aughtry; Aly Z. Dossa

(57) ABSTRACT

A method for managing knowledge graphs in a distributed system includes obtaining, by a first distributed ledger technology (DLT) node of a plurality of DLT nodes in a DLT environment, a fact from a source node; initiating, by the first DLT node, fact consensus by the plurality of DLT nodes; making, by the first DLT node, a determination that a fact consensus associated with the fact is reached; in response to the determination: saving, by the first DLT node, the fact in a first immutable log in a storage associated with the first DLT node, wherein a client generates a knowledge graph using the immutable log; performing an incremental update of a first local knowledge graph associated with the first DLT node; and syncing, by the first DLT node, the fact with a DLT archive node that comprises an archive copy of the first immutable log.

11 Claims, 9 Drawing Sheets

GENERATING KNOWLEDGE GRAPHS USING DISTRIBUTED LEDGER TECHNOLOGIES

REFERENCE TO RELATED APPLICATIONS

This application claims priority to U.S. Provisional Patent Application No. 63/436,964 filed Jan. 4, 2023 and entitled "USING DISTRIBUTED LEDGER TECHNOLOGIES TO BUILD KNOWLEDGE GRAPHS," the contents of which are incorporated by reference herein in their entirety for all purposes.

BACKGROUND

Computing devices may provide services. To provide the services, the computing devices may use data. The data may be associated with a domain. The data may include facts associated with entities, objects, and events associated with the domain. The facts may be related to other facts. To improve the services, the facts may be stored and updated over time.

SUMMARY

In general, certain embodiments described herein relate to a method for managing knowledge graphs in a distributed system. The method may include obtaining, by a first distributed ledger technology (DLT) node of a plurality of DLT nodes in a DLT environment, a fact from a source node; initiating, by the first DLT node, fact consensus by the plurality of DLT nodes; making, by the first DLT node, a determination that a fact consensus associated with the fact is reached; in response to the determination: saving, by the first DLT node, the fact in a first immutable log in a storage associated with the first DLT node, wherein a client generates a knowledge graph using the immutable log; performing an incremental update of a first local knowledge graph associated with the first DLT node; and syncing, by the first DLT node, the fact with a DLT archive node that comprises an archive copy of the first immutable log.

In general, certain embodiments described herein relate to a system for managing knowledge graphs in a distributed system. The system includes a distributed ledger technology (DLT) environment. The system also includes a first DLT node of the DLT environment that includes a processor and memory and is programmed to obtain a fact from a source node; initiate fact consensus by the plurality of DLT nodes; make a determination that a fact consensus associated with the fact is reached; in response to the determination: save the fact in a first immutable log in a storage associated with the first DLT node, wherein a client generates a new knowledge graph using the immutable log; perform an incremental update of a first local knowledge graph associated with the first DLT node using the fact and the immutable log; and sync the fact with a DLT archive node that comprises an archive copy of the first immutable log.

In general, certain embodiments described herein relate to a non-transitory computer readable medium that includes computer readable program code, which when executed by a computer processor enables the computer processor to perform a method for managing knowledge graphs in a distributed system. The method may include obtaining, by a first distributed ledger technology (DLT) node of a plurality of DLT nodes in a DLT environment, a fact from a source node; initiating, by the first DLT node, fact consensus by the plurality of DLT nodes; making, by the first DLT node, a determination that a fact consensus associated with the fact is reached; in response to the determination: saving, by the first DLT node, the fact in a first immutable log in a storage associated with the first DLT node, wherein a client generates a knowledge graph using the immutable log; performing an incremental update of a first local knowledge graph associated with the first DLT node; and syncing, by the first DLT node, the fact with a DLT archive node that comprises an archive copy of the first immutable log.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Figure 1A:
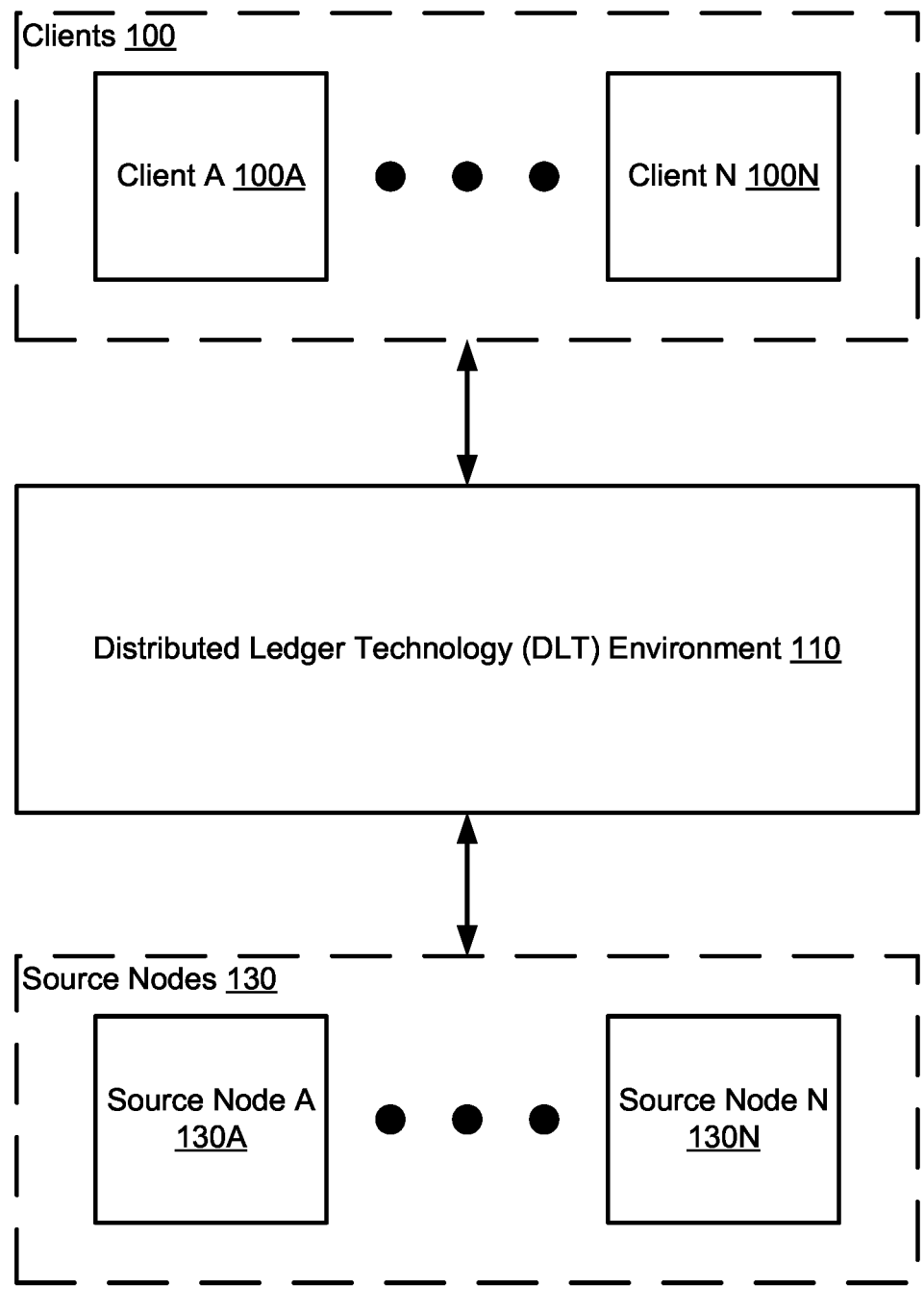
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments of the present embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments disclosed herein relate to systems, devices, and methods for maintaining immutable logs in a distributed environment using a distributed ledger technology environment and using the immutable logs to generate knowledge graphs.

Knowledge graphs may refer to data structures that store and retrieve facts related to entities, objects, and/or events. A semantic graph may be a type of knowledge graph. A fact may refer to a discrete piece of information that can be interrelated to other facts to form a graph. Collectively, the graph may store knowledge that can describe a domain of interest by interrelating all the information about a domain, in a flexible and expansive way. A domain of interest may cover all aspects of a given application, such as a pharmaceutical supply chain, including all the entities, rules and data schemas relating to that domain within a single graph. Knowledge graphs may support query languages that can be used to retrieve related facts and allows existing facts to be deleted or new facts to be added. A knowledge graph may represent all facts known about a domain at a specific point in time and may continually evolve over time as new facts are added and old ones deleted. Knowledge graphs may be ideally suited for implementing metadata indexes to reference and annotate unstructured data objects, such as documents and images, as they may model not only the entities but the relationships between them.

As with conventional structured data storage technologies, the emergence of the Edge has highlighted the need to support distributed, decentralized solutions. That is, two or more distributed knowledge graphs that may require the maintenance of data consistency between all the nodes in the system. Achieving eventual data consistency between discrete nodes in a knowledge graph is an open research question. The conventional approach is to synchronize the knowledge graphs themselves through some proprietary mechanism, but this presents challenges caused by inconsistences due to simultaneous mutually exclusive updates. Fixing inconsistencies usually requires manual intervention, and embodiments disclosed herein may circumvent these problems by not allowing inconsistences in the first place.

Additionally, in distributed systems, interconnected through a network, latencies or delays may lead to out-of-order knowledge-sharing and inconsistent graphs across nodes. If facts are not received in the order they were transmitted, then the resulting graphs may be based on inaccurate knowledge and solutions built on top of them will be unreliable. Furthermore, in a distributed environment such as the edge, devices that generate data or build graphs, may have vastly different processing capabilities. A low-powered edge server with limited computational resources may not be able to run the same algorithms or functions as a powerful edge server or other server with more computational resources. Existing solutions with unified or centralized graph generation may not work in such scenarios. Moreover, due to the diverse source of knowledge (or data), it may include noise, contradictions, or even malicious information. Collating such knowledge into consistent and accurate knowledge graphs may be a challenge in the absence of a centralized controlling entity. Furthermore, actively sharing new facts and knowledge with each node in the system, may not lead to a scalable solution, especially as the number of nodes increases.

To address, at least in part, the various challenges of building knowledge graphs in a decentralized environment discussed above, embodiments disclosed herein may relate to sharing knowledge across nodes using distributed ledger technologies (DLT), constructing immutable logs that include fact entries that eliminate the need to actively share knowledge with each node in the system, and using the immutable logs to update distributed knowledge graphs or to build knowledge graphs from scratch. In one or more embodiments disclosed herein, a node that generates events or facts may not be required to share that knowledge with all other nodes in the system. Instead, facts may be written to a DLT node where consensus regarding the order of facts (e.g., timestamps) may be achieved through the consensus algorithm of the underlying DLT. These immutable logs may then be used to update distributed knowledge graphs over time as new facts or transactions are added by source nodes such that each knowledge graph generated or updated using the immutable logs may reach eventual consistency. The immutable logs may also be used by clients of the distributed environment to generate various types of knowledge graphs. Further embodiments disclosed herein are described below.

Various data structures may be, or have been, used for storing collective, relational knowledge across a distributed system. These data structures may include relational databases, labeled property graphs, and semantic graphs. Each of these data structures may include their own set of characteristics, advantages, and disadvantages. Each of these data structures is discussed below.

Relational databases may refer to one or more data structures that may be very powerful for storing structured data in tables and interrelating the data using foreign keys (e.g., links between tables or portions of tables). Relational databases may store data into two types of files: a data file and a log file. Data files may include the current content of all the tables and the log files may include all the transactions (e.g., insert, update, delete, etc.) performed on the tables in a time-ordered sequence. Relational databases may be very good at performing structured queries (e.g., such as finding the average age of all children that have a father). For example, Structured Query Language (SQL) is a powerful query language for relational databases that has been standardized for many years and is one of the main reasons for using relational databases.

However, relational databases rely on the data conforming to the tables' structure (e.g., specific column attributes, cell data input type and/or quantity, etc.). Relational databases may assume that the data conforms to a proscribed static view of the world modeled by the database schema. Problems may arise if data does not fit neatly in the cells of the table or if the data is missing. Additionally, foreign keys may only be implemented as many-to-one relationships (e.g., Ted is a father to Alice, Bob, Charlie, etc.), and may not support many-to-many relationships. To implement many-to-many relationships, intermediary mapping tables may be used. However, joins between tables may become costly as the relational database grows. Additionally, adding intermediary tables and additional foreign keys may quickly become convoluted and difficult to manage. Furthermore, new data types, new database exceptions, or new column attributes may be added, which may require manually updating the relational database schema. Changing the schema may be complex and may need to be rolled out to all instances of the database in a distributed system to avoid structural inconsistencies between instances. So, synchronizing distributed relational databases may be problematic from both a data and schema consistency perspective.

In one or more embodiments, a knowledge graph may include two different types of knowledge graphs, a labeled property graph (LPG) and a semantic graph. Each of the aforementioned types of knowledge graphs is discussed below.

In one or more embodiments, a labeled property graph may be one or more data structures include nodes and directed edges connecting the nodes. Conceptually, if the rows of each relational database table are split into individual nodes, all the row fields are converted to key-value pairs within the nodes, the nodes are labeled with the corresponding table names, and the foreign keys are replaced with directed edges connecting the nodes, then a LPG may be generated out of relational database. LPGs may not require a schema on write and in some cases may not require a schema at all. Each node in the LPG may represent an entity on which data is to be stored. The properties of the entity (e.g., for a human: name, age, gender, height, hair color, etc.), may simply be key-value pairs. LPGs may include a lot of flexibility in what properties are stored and their data structures.

Critically, relationships LPGs may be defined externally, by linking associated nodes with directed edges. The edges themselves may include a label specifying the type of relationship between the nodes. Additionally, edges may include properties that further define the relationship. The edges may be directed from one node to another (e.g., in the direction of the arrow) but there may be as many edges between nodes as are useful, the edges can point in either direction, and there may be many-to-many relationships. The nodes and edges may form a graph, hence the name LPG. Up until recently, LPGs only included proprietary query languages, which made interoperability very difficult. But in recent years there has been a move to adopt a common query language for LPGs called Graph Query Language (GQL), which is very similar to SQL.

Turning now to semantic graphs, conceptually, if each property in an LPG node is split into individual nodes that are linked together with directed edges that include labels specifying the relationship between each node, then a semantic graph may be generated. The basic unit of information in a semantic graph is the triple, which may include a subject, an object that it links to, and a predicate that semantically defines the relationship between them. A subject must be some unique, global identifier (e.g., a unique combination of alphanumeric characters such as "AB1234") for the subject (e.g., person, entity, event, etc.), and an object may be a literal (e.g., a property) or another unique identifier associated with another subject, which would be the subject of another triple. Collectively, a subject, object, and predicate represent a single fact. For example, a fact may include a subject that includes the identifier "123", the predicate may be "name", and the object may be "Alice". As a result, the fact may specify that "123" includes the name "Alice". Throughout this detailed description, a fact may refer to a triple.

When a new fact is inserted into a Semantic Graph, a user may specify the subject, predicate, object of the fact, and the semantic graph may automatically link the fact to all other facts that have the same subject. Accordingly, over time the semantic graph may form a web of interrelated facts. The main standard for semantic graphs is the Resource Description Framework (RDF) moderated by the World Wide Web Consortium (W3C). Other standards may be used without departing from embodiments disclosed herein. In one or more embodiments disclosed herein, RDF includes a query language called SPARQL Protocol and RDF Query Language (SPARQL). SPARQL may be very similar to SQL, but does have significant differences. Other and/or additional methods or query languages may be used to update semantic graphs without departing from embodiments disclosed herein.

In one or more embodiments disclosed herein, SPARQL may support selecting facts from a semantic graph (e.g., querying the data), inserting facts, and deleting facts, but significantly it does not support updating facts. This is because facts are atomic, e.g., they are self-contained and stand on their own. So, a fact in a semantic graph may be immutable, it may be added or removed but not modified. Instead, an old fact may be deleted and a new one may be added in a single operation. This may appear a moot point, but conceptually is very important to how a semantic graph works. For example, Bob (ID: 037) may change his hair from red to white, this is achieved in a semantic graph by removing the (037 (subject), Hair color (predicate), Red (object)) fact and inserting the (037 (subject), Hair color (predicate), White (object)) fact.

In this example, at one point in time Bob's hair was red, and then later his hair was white. Both sets of facts (the world view) are true and consistent, but they represent two different world views at two different points in times. Semantic graphs have what is called an open world view, that is, there may be facts out there that are not currently part of the semantic graph but that does not mean that they do not exist. This is very different to a relational database, which may include a closed world view.

In a relational database it is often necessary to lock several tables when updating mutually consistent data, but many implementations of semantic graphs do not support transaction, because structurally it is unnecessary; facts are atomic and do not rely on other facts. Only the write order of the facts is important to maintain temporal consistency of the semantic graph.

Semantic graphs may include other advantages such as logical constraints and logical inference. Nothing prevents logically incompatible facts from being added to a semantic graph. However, logical constraints may be added to a semantic graph to check for consistency between facts, e.g., a child must be younger than its parent. However, these constraints only check the consistency of the semantic graph, they may not prevent inconsistent facts from being added. So inconsistent facts may be identified using logical constraints and subsequently fixed to conform to a logical world view. The constraints may also codified as triples in the semantic graph. One of the most powerful features of a semantic graph is the ability to infer new facts from existing ones. Inference rules may be defined that allow a reasoning engine to infer new facts based on the current set of facts in a semantic graph. These inference rules may also be codified as triples. For example, a symmetric rule that states that children who share a parent are siblings, infers a sibling relationship between Bob and Alice who share a parent, or a transitive rule that states that the sibling of a male sibling has a brother relationship. Many such rules can be defined that, in combination with the logical constraint rules, provide a context for the facts and give them meaning, hence the name semantic graph.

While the data structures are discussed above as including relational databases, LPGs, and semantic graphs, embodiments disclosed herein and discussed below throughout the rest of this Detailed Description relate to semantic graphs only. A "fact" as used herein and discussed below may refer to a triple of a semantic graph. A "knowledge graph" as used herein and discussed below may refer to only a semantic graph. While discussed below and throughout the remainder of this Detailed Description as relating to sematic graphs only, one of ordinary skill in the relevant art may appreciate that the embodiments disclosed herein may be applied to LPGs and/or relational databases without departing from the embodiments disclosed herein.

FIG. 1A shows a diagram of a system in accordance with one or more embodiments disclosed herein. The system may include clients (100) that obtain immutable log services from a distributed ledger technology (DLT) environment (110). The immutable log services may include obtaining facts from source nodes (130), establishing, and maintaining, a time-order consensus of facts across multiple DLT nodes in the DLT environment (110), storing an immutable log of facts, and updating and/or generating knowledge graphs using the immutable log of facts. By utilizing such services, the clients (100) may be able to reliably and efficiently obtain and/or generate knowledge graphs using an immutable log of facts obtained from any of the DLT nodes in the DLT environment (110). The system may include other and/or additional components without departing from embodiments disclosed herein.

The components of the system illustrated in FIG. 1A may be operatively connected to each other and/or operatively connected to other entities (not shown) via any combination of wired (e.g., Ethernet) and/or wireless networks (e.g., Wide Area Networks (WANs), Local Area Networks (LANs), Internet, etc.) (not shown). Each component of the system illustrated in FIG. 1 is discussed below.

The clients (100) may be implemented using one or more computing devices. A computing device may be, for example, a mobile phone, tablet computer, laptop computer, desktop computer, server, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2A-2D. The clients (100) may be implemented using other types of computing devices without departing from embodiments disclosed herein. For additional details regarding computing devices, refer to FIG. 3.

The clients (100) may be implemented using logical devices without departing from embodiments disclosed herein. For example, the clients (100) may include virtual machines that utilize computing resources of any number of physical computing devices to provide the functionality of the clients (100). The clients (100) may be implemented using other types of logical devices without departing from embodiments disclosed herein.

In one or more embodiments disclosed herein, the clients (100) may be programmed to, or otherwise configured to, include the functionality to generate knowledge graphs using immutable logs obtained from the DLT environment (110). The clients may generate full knowledge graphs, point-in-time knowledge graphs, and/or knowledge subgraphs using the immutable logs. The clients (100) may also include the functionality to obtain knowledge graphs from the DLT environment (110) and/or incrementally update a knowledge graph using new facts stored in the immutable log obtained from the DLT environment. The clients (100) may further include the functionality to transmit and obtain requests and information to and from the DLT environment (110). The clients (100) may also include the functionality to perform other computer implemented services without departing from embodiments disclosed herein. The computer implemented services may include, for example, database services, inferencing services, electronic mail communication services and/or any other computer implemented services without departing from embodiments disclosed herein. The clients (100) may include the functionality to perform all, or a portion, of the methods of FIG. 2A-2D. The clients (100) may include other and/or additional functionalities without departing from embodiments disclosed herein.

A system in accordance with one or more embodiments disclosed herein may include any number of clients (e.g., 100A, 100N) without departing from embodiments disclosed herein. For example, a system may include a single client (e.g., 100A) or multiple clients (e.g., 100A, 100N).

In one or more embodiments disclosed herein, the DLT environment (110) may include multiple DLT nodes (discussed below) and DLT archive nodes (discussed below). The DLT environment (110) may include the functionality to perform immutable log services. As discussed above, the immutable log services may include obtaining facts from source nodes (130), establishing, and maintaining, a consensus of facts across multiple DLT nodes in the DLT environment (110), storing an immutable log of facts, and updating and/or generating knowledge graphs based on the immutable log of facts. The DLT environment may include other and/or additional functionalities without departing from embodiments disclosed herein. For additional information regarding the DLT environment (110), refer to FIG. 1B.

In one or more embodiments disclosed herein, the source nodes (130) may be implemented using one or more computing devices. A computing device may be, for example, a mobile phone, tablet computer, laptop computer, desktop computer, server, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIG. 2A. The source nodes (130) may be implemented using other types of computing devices without departing from embodiments disclosed herein. For additional details regarding computing devices, refer to FIG. 3.

The source nodes (130) may be implemented using logical devices without departing from embodiments disclosed herein. For example, the source nodes (130) may include virtual machines that utilize computing resources of any number of physical computing devices to provide the functionality of the source nodes (130). The source nodes (130) may be implemented using other types of logical devices without departing from embodiments disclosed herein.

In one or more embodiments disclosed herein, the source nodes (130) may be programmed to, or otherwise configured to, include the functionality to generate and/or provide facts and/or fact transactions to the DLT environment (110). Each source node (e.g., 130A), or a user thereof, may submit any quantity of facts and/or fact transactions to one or more of the DLT nodes in the DLT environment (110) without departing from embodiments disclosed herein. In one or more embodiments, a fact transaction may include an insert transaction (e.g., insert or otherwise add a new fact), a delete transaction (e.g., delete an existing fact), or an update transaction (e.g., delete an old fact and add a corresponding new fact). The source nodes (130) may include the functionality to perform all, or a portion, of the methods of FIG. 2A. The source nodes (130) may include other and/or additional functionalities without departing from embodiments disclosed herein.

A system in accordance with one or more embodiments disclosed herein may include any number of source nodes (e.g., 130A, 130N) without departing from embodiments disclosed herein. For example, a system may include a single source node (e.g., 130A) or multiple source nodes (e.g., 130A, 130N).

Figure 1B:
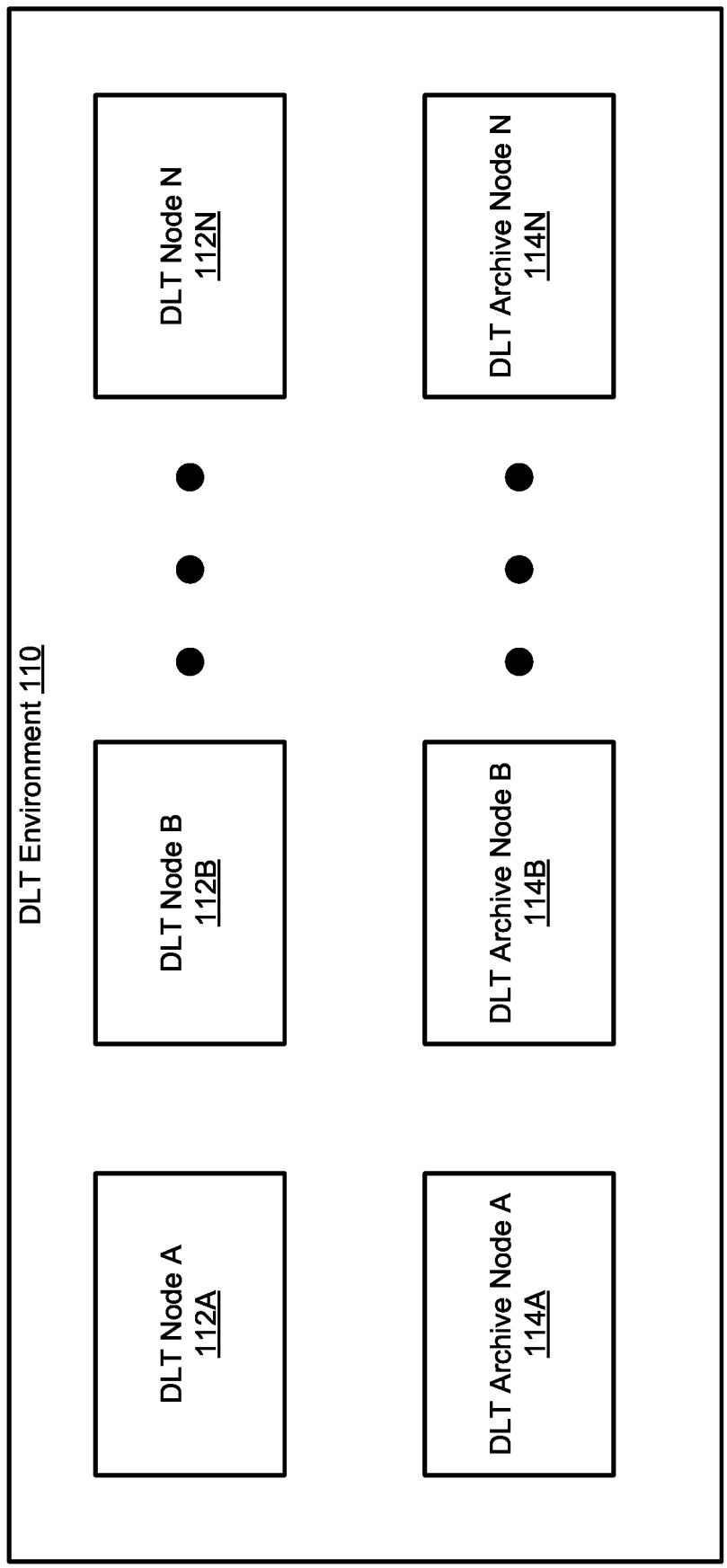
FIG. 1B shows a diagram of a DLT environment in accordance with one or more embodiments disclosed herein.

FIG. 1B shows a diagram of a DLT environment in accordance with one or more embodiments disclosed herein. The DLT environment (110) may be an embodiment of the DLT environment (e.g., 110, FIG. 1A) discussed above. As discussed above, the DLT environment (110) may include the functionality to perform immutable log services. Also as discussed above, the immutable log services may include obtaining facts from source nodes (130), establishing, and maintaining, a consensus of facts across multiple DLT nodes in the DLT environment (110), storing an immutable log of facts, and updating and/or generating knowledge graphs based on the immutable log of facts. To provide the aforementioned services, the DLT environment (110) may include multiple DLT nodes and multiple DLT archive nodes. The DLT nodes may include DLT node A (112A), DLT node B (112B), and DLT node N (112). The DLT archive nodes may include DLT archive node A (114A), DLT archive node B (114B), and DLT archive node N (114N). There may be any quantity of DLT nodes and/or DLT archive nodes without departing from embodiments disclosed herein. The DLT environment (110) may include other, fewer, and/or additional components without departing from embodiments disclosed herein. Each of the aforementioned components of the DLT environment (110) is discussed below.

In one or more embodiments disclosed herein, the DLT nodes (e.g., 112A, 112B, 112N) may be implemented using one or more computing devices. A computing device may be, for example, a mobile phone, tablet computer, laptop computer, desktop computer, server, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2A-2D. The DLT nodes (e.g., 112A, 112B, 112N) may be implemented using other types of computing devices without departing from embodiments disclosed herein. For additional details regarding computing devices, refer to FIG. 3.

The DLT nodes (e.g., 112A, 112B, 112N) may be implemented using logical devices without departing from embodiments disclosed herein. For example, the DLT nodes (e.g., 112A, 112B. 112N) may include virtual machines that utilize computing resources of any number of physical computing devices to provide the functionality of the DLT nodes (e.g., 112A, 112B, 112N). The DLT nodes (e.g., 112A, 112B, 112N) may be implemented using other types of logical devices without departing from embodiments disclosed herein.

In one or more embodiments disclosed herein, the DLT nodes (e.g., 112A, 112B, 112N) may be programmed to, or otherwise configured to, include the functionality to perform a portion of the immutable log services of the DLT environment (110). To perform the portion of immutable log services, each DLT node (e.g., 112A) may: (i) obtain facts from one or more source nodes (130), (ii) initiate a consensus of the fact among all other DLT nodes, (iii) once consensus regarding the fact is reached on all, or a portion of, the other DLT nodes, then the DLT node stores the fact in an immutable log. (iv) incrementally updating a local knowledge graph, and/or (v) providing the immutable log (or a copy of the immutable log) to one or more clients (100, FIG. 1A) for knowledge graph generation. In one or more embodiments, incrementally updating a local knowledge graph may include adding a newly stored fact in the immutable log to the knowledge graph, deleting a fact from the knowledge graph based on a deletion transaction obtained from a source node (e.g., 130A, FIG. 1A), or deleting a fact and adding a new fact based on an update transaction obtained from a source node (e.g., 130A, FIG. 1A). The DLT nodes (e.g., 112A, 112B, 112N) may also include the functionality to sync facts and the immutable log with one or more DLT archive nodes, generate and provide snapshots of local knowledge graphs to the DLT archive nodes, and may delete portions of the immutable log in response to identifying a log clearance event. The DLT nodes (e.g., 112A, 112B, 112N) may include the functionality to perform all, or a portion, of the methods of FIGS. 2A-2D without departing from embodiments disclosed herein. For additional information regarding the functionality of the DLT nodes (e.g., 112A, 112B, 112N), refer to FIGS. 2A-2D. The DLT nodes (e.g., 112A, 112B, 112N) may include other and/or additional functionalities without departing from embodiments disclosed herein. For additional information regarding the DLT nodes (e.g., 112A, 112B, 112N), refer to FIG. 1C.

In one or more embodiments disclosed herein, the DLT archive nodes (e.g., 114A, 114B, 114N) may be implemented using one or more computing devices. A computing device may be, for example, a mobile phone, tablet computer, laptop computer, desktop computer, server, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2A-2D. The DLT archive nodes (e.g., 114A, 114B. 114N) may be implemented using other types of computing devices without departing from embodiments disclosed herein. For additional details regarding computing devices, refer to FIG. 3.

The DLT archive nodes (e.g., 114A, 114B, 114N) may be implemented using logical devices without departing from embodiments disclosed herein. For example, the DLT archive nodes (e.g., 114A, 114B. 114N) may include virtual machines that utilize computing resources of any number of physical computing devices to provide the functionality of the DLT archive nodes (e.g., 114A, 114B, 114N). The DLT archive nodes (e.g., 114A, 114B, 114N) may be implemented using other types of logical devices without departing from embodiments disclosed herein.

In one or more embodiments disclosed herein, the DLT archive nodes (e.g., 114A, 114B, 114N) may be programmed to, or otherwise configured to, include the functionality to perform a portion of the immutable log services of the DLT environment (110). To perform the portion of immutable log services, each DLT archive node (e.g., 114A) may: (i) perform long term or archive storage of immutable logs and knowledge graph snapshots of the DLT nodes (112A, 112B 112N), and (ii) provide all, or portions of, archived immutable logs and/or the knowledge graph snapshots to the DLT nodes (112A, 112B 112N) and/or directly to clients for generation of knowledge graphs. In one or more embodiments, the amount of data included in the immutable logs may be substantial. Additionally, older data may be rarely or never used for the generation of knowledge graphs. Furthermore, one or more DLT nodes (e.g., 112A, 112B, 112N) may be nodes that include limited storage capacity such as edge nodes. To offload the storage burden on the DLT nodes (e.g., 112A, 112B, and 112N) may sync the immutable logs with the DLT archive nodes (e.g., 114A, 114B, and 114N), generate and provide snapshots of knowledge graphs, and may delete old or infrequently used data. The archived portion of the immutable logs and the knowledge graph snapshots stored in the DLT archive nodes (e.g., 114A, 114B, 114N) may be used by the DLT nodes (e.g., 112A, 112B, 112N) or the clients (100, FIG. 1A) to rebuild the deleted portions of the immutable log and/or generate knowledge graphs. Each DLT archive node (114A, 114B, 114N) may include an archived copy of one or more of the immutable logs and/or snapshots of knowledge graphs included in the system. The DLT archive nodes (e.g., 114A, 114B, 114N) may include the functionality to perform all, or a portion, of the methods of FIGS. 2A-2C without departing from embodiments disclosed herein. For additional information regarding the functionality of the DLT archive nodes (e.g., 114A, 114B, 114N), refer to FIGS. 2A-2C. The DLT archive nodes (e.g., 114A, 114B, 114N) may include other and/or additional functionalities without departing from embodiments disclosed herein.

Figure 1C:
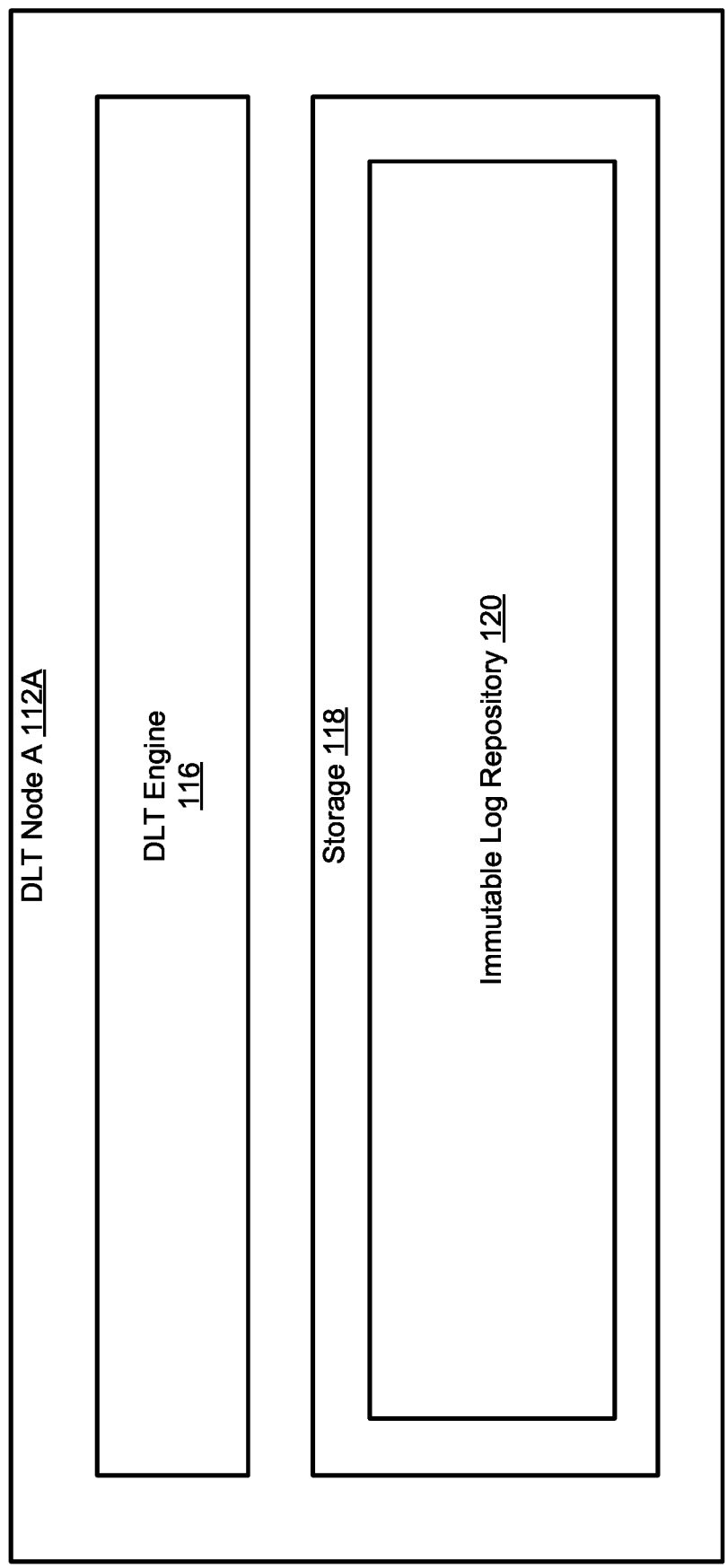
FIG. 1C shows a diagram of a DLT node in accordance with one or more embodiments disclosed herein.

FIG. 1C shows a diagram of a DLT node in accordance with one or more embodiments disclosed herein. DLT node A (112A) may be an embodiment of the DLT nodes (112A, 112B, 112N, FIG. 1B) discussed above. As discussed above, DLT node A (112A) may provide a portion of the immutable log services. To provide the portion of the immutable log services, DLT node A (112A) may include a DLT engine (116) and storage (118). DLT node A (112A) may include other, fewer, and/or additional components without departing from embodiments disclosed herein. Each of the aforementioned components is discussed below.

In one or more embodiments disclosed herein, the DLT engine (116) may be implemented as a physical device. The physical device may include circuitry. The physical device may be, for example, a field-programmable gate array, application specific integrated circuit, programmable processor, microcontroller, digital signal processor, or other hardware processor. The physical device may be programmed or otherwise configured to provide the functionality of the DLT engine (116) described throughout this Detailed Description.

In one or more embodiments disclosed herein, the DLT engine (116) may be implemented as computer instructions, e.g., computer code, stored on a storage that when executed by a processor of DLT node A (112A) causes DLT node A (112A) to provide the functionality of the DLT engine (116) described throughout this Detailed Description. In one or more embodiments disclosed herein, the DLT engine (116) may include the functionality to provide the portion of the immutable log services performed by DLT node A (112A). The DLT engine may: (i) obtain facts from one or more source nodes (130), (ii) initiate a consensus of the fact among all other DLT nodes, (iii) once consensus regarding the fact is reached on all, or a portion of, the other DLT nodes, then store the fact in an immutable log in storage (118), (iv) incrementally updating a local knowledge graph, and/or (v) provide the immutable log (or a copy of the immutable log) to one or more clients (100, FIG. 1A) for knowledge graph generation. The DLT engine (116) may also include the functionality to sync facts and the immutable log with one or more DLT archive nodes, generate snapshots of knowledge graph, send snapshots to one or more DLT archive nodes, and may delete portions of the immutable log in response to identifying a log clearance event. The DLT engine (116) may execute or otherwise provide the functionality of a SPARQL executioner that implements the SPARQL protocol and query language. The DLT engine (116) may provide the functionality of other and/or additional methods (e.g., programmatic language bindings) for updating RDF implementation of a knowledge graph (semantic graph) without departing from embodiments disclosed herein. The DLT engine (116) may include other and/or additional functionality without departing from embodiments disclosed herein.

In one or more embodiments disclosed herein, the storage (118) may be implemented using a storage device. The storage device may be implemented using physical storage devices and/or logical storage devices. The storage (118) may be implemented using other types of devices that provide data storage services without departing from the embodiments disclosed herein.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments disclosed herein, the storage (118) may be programmed to, or otherwise configured to, include the functionality to provide data storage services to DLT node A (112A), the DLT engine (116), and/or other entities. The data storage services may include storing of data and providing of previous stored data. The storage (118) may include the functionality to provide other and/or additional services without departing from embodiments disclosed herein. The storage (118) may store data structures including an immutable log repository (120). The storage (118) may store other and/or additional data structures without departing from embodiments disclosed herein.

In one or more embodiments disclosed herein, immutable log repository (120) may be one or more data structures that may include one or more facts about an entity in a knowledge domain. The immutable log repository (120) may include any quantity of immutable logs associated with any quantity of knowledge domains without departing from embodiments disclosed herein. For additional details regarding the immutable log repository (120), refer to FIG. 1D.

Although not shown in the storage (118) in FIG. 1C, the storage (118) may also include a local knowledge graph. The local knowledge graph may refer to a knowledge graph that represents the state of the domain associated with the knowledge graph at the current time based on the immutable log stored in the immutable log repository (120) of DLT node A (112A). The local knowledge graph may be incrementally updated over time by DLT node A (112A) as new facts are stored in the immutable logs, as transactions specifying deletion of facts are obtained from source nodes (130, FIG. 1A), and/or as transactions specifying updates (e.g., deletion of old facts and addition of new facts) of facts are obtained from source nodes (130, FIG. 1A). DLT node A (112A) may provide all, or a portion, of the local knowledge graph (or a copy thereof) to one or more clients. In one or more embodiments, each DLT (e.g., 112A, 112B, 112N) in the DLT environment (110) may include a local knowledge graph.

Although not shown in the storage (118) in FIG. 1C, the storage (118) may also include one or more snapshots of the local knowledge graph. Each snapshot of the local knowledge graph may be associated with a different, previous point in time. In other words, each snapshot may include the local knowledge graph at a different time in the past. The snapshots may be used to generate point-in-time knowledge graphs. The snapshots may be offloaded to one or more the DLT archive nodes over time based on age (e.g., oldest first) as part of a log clearance event to conserve storage space on DLT node A (112A) while maintaining the availability of the older snapshots.

Figure 1D:
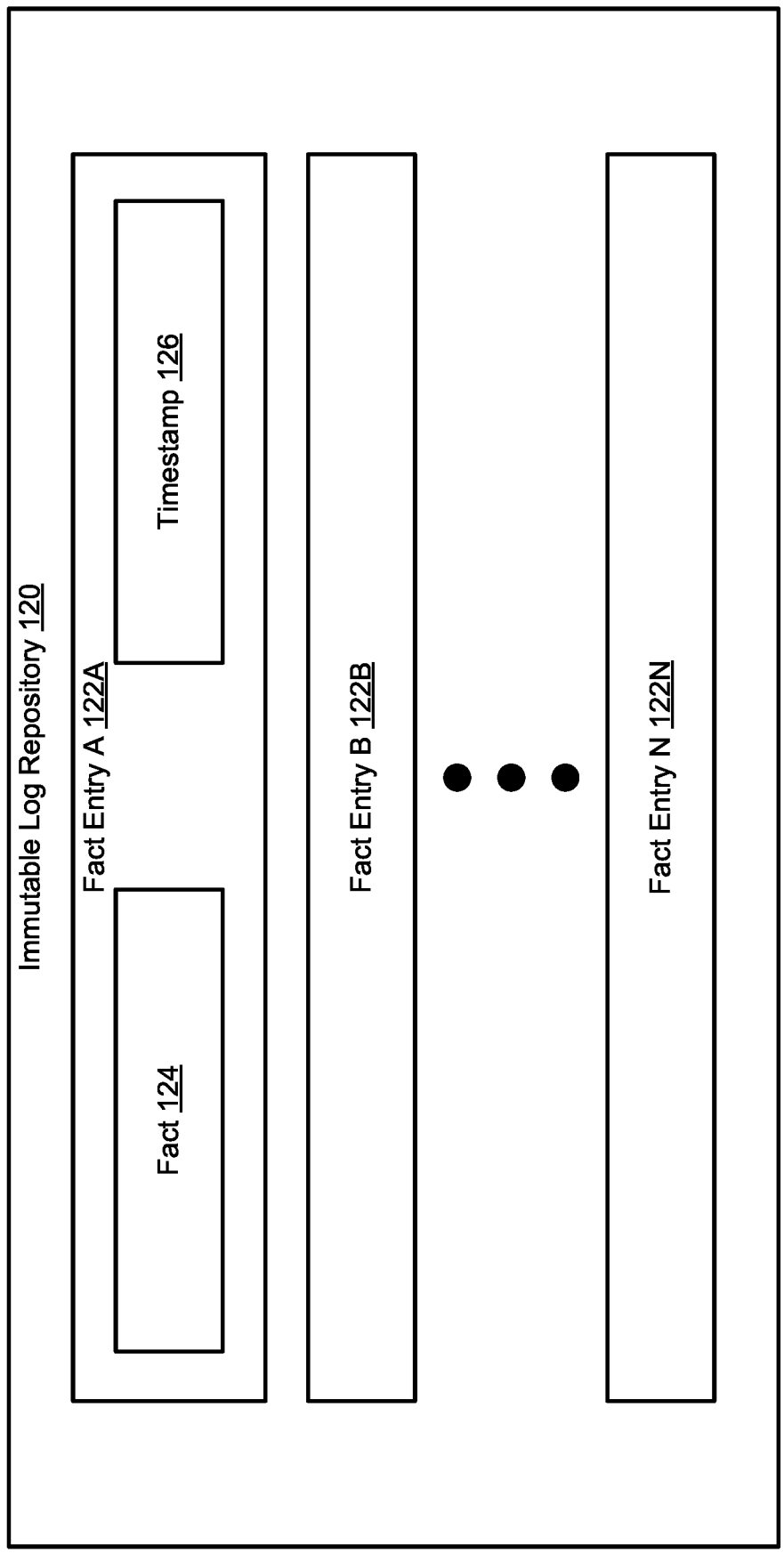
FIG. 1D shows a diagram of an immutable log repository in accordance with one or more embodiments disclosed herein.

FIG. 1D shows a diagram of an immutable log repository in accordance with one or more embodiments disclosed herein. The immutable log repository (120) may be an embodiment of the immutable log repository (120, FIG. 1C) discussed above. As discussed above, the immutable log repository (120) may include facts associated with entities in a knowledge domain. As such, the immutable log repository (120) may include any quantities of fact entries such as fact entry A (122A), fact entry B (122B), and fact entry N (122N) without departing from embodiments disclosed herein. In one or more embodiments, each fact entry (e.g., 122A) may include a fact (124) and a timestamp (126). The fact entries (e.g., 122A, 122B, 122N) may include other, fewer, and/or additional information without departing from embodiments disclosed herein. Each of the aforementioned types of information is discussed below.

In one or more embodiments disclosed herein, a fact (124) may refer to any discrete piece of information that may be related with other discrete pieces of information (e.g., other facts) that may be used to build a knowledge graph of a domain. Each fact may be associated with entities, objects, and/or events within a domain. A fact may include a triple (discussed above). A domain may refer to an area of interest or an application that all the facts may be associated with. For example, a domain may include a pharmaceutical supply chain. A first fact may be that a first company made a first shipment of pharmaceuticals to a second company. A second fact may be that the second company sold a portion of the pharmaceuticals to a third company, and so on. The fact (124) may include any discrete piece of information associated with a domain without departing from embodiments disclosed herein. The domain may include any type of domain without departing from embodiments disclosed herein. The fact (124) may include other and/or additional information without departing from embodiments disclosed herein.

In one or more embodiments disclosed herein, the timestamp (126) may refer to the point in time the fact (124) of the fact entry (e.g., 122A) was received by a DLT node (e.g., DLT node A (112A)) of the DLT environment (110, FIG. 1A) from a source node of the source nodes (130, FIG. 1A). The timestamp (126) may include any one or more units or representations of a point in time of any granularity without departing from embodiments disclosed herein. For example, the timestamp (126) may include the millisecond, second, minute, hour, day, month, and year that a fact was obtained by a DLT node (e.g., DLT node A (112A)) of the DLT environment (110, FIG. 1A) from a source node of the source nodes (130, FIG. 1A).

In another embodiment, the timestamp (126) may refer to the point in time in which consensus associated with the fact (124) of the fact entry (e.g., 122A) was reached by the DLT nodes (e.g., 112A, 112B, 112N, FIG. 1B) of the DLT environment (110, FIG. 1A). In yet another embodiment, the timestamp (126) may include both: (i) the point in time the fact (124) of the fact entry (e.g., 122A) was received by a DLT node (e.g., DLT node A (112A)) of the DLT environment (110, FIG. 1A) from a source node of the source nodes (130, FIG. 1A), and (ii) the point in time in which consensus associated with the fact (124) of the fact entry (e.g., 122A) was reached by the DLT nodes (e.g., 112A, 112B, 112N, FIG. 1B) of the DLT environment (110, FIG. 1A). The timestamp (126) may include other and/or additional information (e.g., time zone) without departing from embodiments disclosed herein.

While the data structures (e.g., 120) are illustrated or discussed throughout this Detailed Description as separate data structures and have been discussed as including a limited amount of specific information, any of the aforementioned data structures may be divided into any number of data structures, combined with any number of other data structures, and may include additional, less, and/or different information without departing from the embodiments disclosed herein. Additionally, while illustrated as being stored in the storage (118), any of the aforementioned data structures may be stored in different locations (e.g., in persistent storage of other computing devices) and/or spanned across any number of computing devices without departing from embodiments disclosed herein. The data structures of the storage (118) may be implemented using, for example, lists, linked lists, tables, unstructured data, databases, etc. While illustrated in FIGS. 1C-1D as being stored locally, the data structures (e.g., 122, 124, 126) may be stored remotely and may be distributed across any number of devices without departing from embodiments disclosed herein.

Figure 2A:
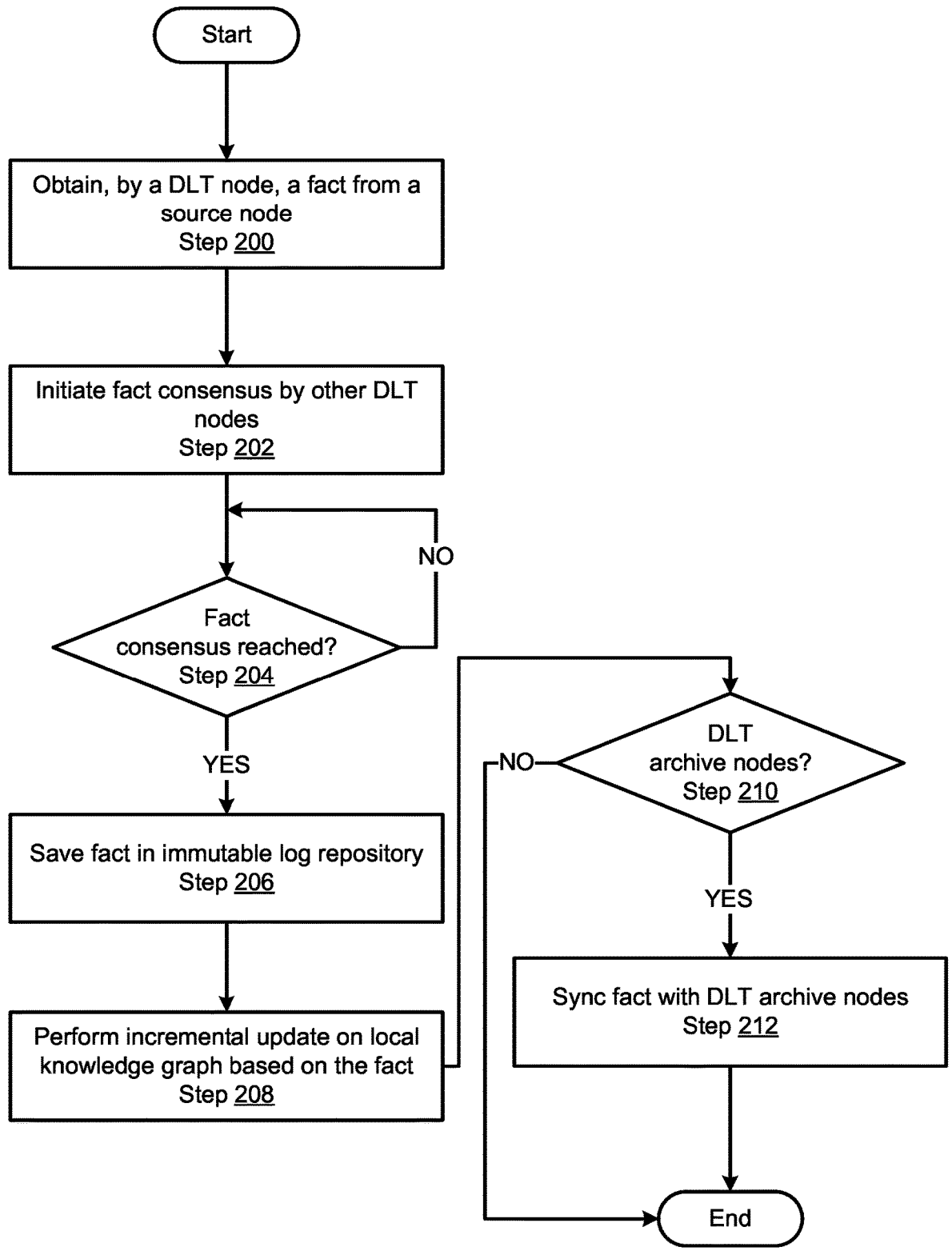
FIG. 2A shows a flowchart of a method for incrementally updating a local knowledge graph in accordance with one or more embodiments disclosed herein.

FIG. 2A shows a flowchart of a method for incrementally updating a local knowledge graph in accordance with one or more embodiments disclosed herein. The method may be performed by, for example, a DLT node (e.g., 112A, FIG.

1B) of the DLT environment (110, FIG. 1). Other and/or additional components of the system illustrated in FIGS. 1A-1C may perform all, or a portion, of the method of FIG. 2A without departing from embodiments disclosed herein.

While FIG. 2A is illustrated as a series of steps, any of the steps may be omitted, performed in a different order, additional steps may be included, and/or any or all of the steps may be performed in a parallel and/or partially overlapping manner without departing from embodiments disclosed herein.

In step 200, a fact is obtained by a DLT node from a source node.

In one or more embodiments disclosed herein, a source node may generate, obtain, or otherwise learn a fact associated with the domain of the DLT environment. In response to obtaining the fact, the source node may then send the fact and a corresponding fact transaction (e.g., insert, update, delete). In one embodiment, the source node may be connected to a particular DLT node via a network. The source node may be connected to the closest DLT node (i.e., the closest DLT node geographically, the DLT node associated with the least amount of network hops between itself and the source node, etc.). In another embodiment, the source node may be connected to all the DLT nodes in the DLT environment and send the fact and the fact transaction to the closest available DLT node (e.g., geographically, the DLT node with the least amount of network hops between itself and the source node, etc.). In yet another embodiment disclosed herein, the source node may send the fact and the fact transaction to a random DLT node in the DLT environment. The source node may send the fact to the DLT node using any appropriate method of data transmission without departing from embodiments disclosed herein. For example, the source node may send the fact and the fact transaction as a message that includes one or more packets through one or more network devices that operatively connect the source node to the DLT node. Additionally, the source node may perform any quantity of security operations (e.g., encryption, authentication, etc.) during the transmission of the fact without departing from embodiments disclosed herein. The fact may be obtained by the DLT node from the source node via other and/or additional methods without departing from embodiments disclosed herein.

In step 202, fact consensus by other DLT nodes is initiated.

In one or more embodiments disclosed herein, the DLT node may initiate a consensus associated with the fact between all, or a portion of, the other DLT nodes in the DLT environment. To initiate the fact consensus, the DLT node may send a message to the other DLT nodes in the DLT environment. The message may include the fact and the corresponding fact transaction. The message may also include a consensus request. The message may be sent using any appropriate method of data transmission without departing from embodiments disclosed herein. For example, the source node may send the fact as a message that includes one or more packets through one or more network devices that operatively connect the DLT node to the other DLT nodes in the DLT environment. The DLT nodes of the DLT environment may be operatively connected through a peer-to-peer (P2P) network. The P2P network may be any appropriate P2P network without departing from embodiments disclosed herein (e.g., Gossip, BitTurrent, etc.). In response to obtaining the message, the other DLT nodes may perform a fact consensus associated with the fact based on the underlying DLT associated with the DLT nodes in the DLT environment. The DLT may include any appropriate DLT without departing from embodiments disclosed herein. For example, the DLT may include a blockchain DLT, an IOTA DLT, etc. The consensus mechanism implemented by the DLT may include, for example, Hashgraph, which ensures asynchronous Byzantine Fault-Tolerance (aBFT). The consensus mechanism may include other and/or additional consensus mechanisms without departing from embodiments disclosed herein. The fact consensus by other DLT nodes may be initiated via other and/or additional methods without departing from the embodiments disclosed herein.

In step 204, a determination is made as to whether fact consensus is reached.

As used herein, consensus associated with a fact may refer to all DLT nodes in the DLT environment may include receiving the fact and the corresponding fact transaction and verifying with the other DLT nodes that the fact and the fact transaction are received and associated with a particular write order. Fact consensus ensures that each fact and corresponding fact transaction are stored on the immutable log in the proper write order in which the fact and the fact transaction were received or fact consensus was reached. As a result, facts and fact transaction may be stored in the immutable log based on their corresponding write order and applied to the local knowledge graphs of each of the DLT nodes based on their write order to achieve eventual consistency over time among all the immutable logs and local knowledge graphs of all the DLT nodes in the DLT environment.

In one or more embodiments disclosed herein, the DLT node may obtain a notification from one, a portion, or all of the DLT nodes in the DLT environment. The notification may indicate that the sending DLT node or the other nodes of the DLT environment have reached a consensus regarding the fact and the fact transaction. In other words, the other DLT nodes may indicate that they have received the fact and fact transaction ensured a particular write order associated with the fact and the fact transaction relative to the other facts and fact transactions included in the immutable log. The notification may be sent using any appropriate method of data transmission without departing from embodiments disclosed herein. For example, the one or more other DLT nodes may send the one or more notifications as messages that includes one or more packets through one or more network devices that operatively connect the one or more other DLT nodes to the DLT node.

In one or more embodiments, if the DLT node obtains a notification from one, a portion, or all other DLT nodes of the DLT environment indicating a consensus regarding the fact has been reached, then the DLT node may determine that fact consensus is reached. In one or more embodiments, if the DLT node has not obtained a notification from one, a portion, or all other DLT nodes of the DLT environment indicating a consensus regarding the fact has been reached, then the DLT node may determine that fact consensus is not reached. The determination as to whether fact consensus associated with the fact is reach may be made via other and/or additional methods without departing from embodiments disclosed herein.

In one or more embodiments disclosed herein, if it is determined that fact consensus is not reached, then the method may proceed to step 204. In other words, the DLT node may wait until fact consensus is reached. In one or more embodiments disclosed herein, if it is determined that fact consensus is reached, then the method may proceed to step 206.

In step 206, the fact is saved in the immutable log repository.

In one or more embodiments disclosed herein, after fact consensus associated with the fact is reached, the DLT node may then save the fact and the corresponding fact transaction in the immutable log repository. The DLT node may generate a new fact entry in the immutable log repository and include the fact, the timestamp associated with the fact, and the fact transaction associated with the fact in the fact entry. In one or more embodiments, the DLT node may order the fact entries of the immutable log repository based on the timestamp associated with the fact to maintain write order fidelity. In one or more embodiments, every other DLT node in the DLT environment may save or otherwise store the fact and the corresponding fact transaction in the immutable log repository associated with each of the other DLT nodes as discussed above. As a result, each DLT node in the DLT environment may eventually have the same immutable logs stored in the same order in their corresponding immutable log repository. Additionally, the fact and corresponding fact transaction may not be applied to the local knowledge graph until consensus has been reach and the fact is stored in the immutable log repository. The fact may be saved in the immutable log repository via other and/or additional methods without departing from embodiments disclosed herein.

In step 208, an incremental update is performed on the local knowledge graph based on the fact.

In one or more embodiments, the DLT node may update the local knowledge graph based on the fact and the fact transaction. In one or more embodiments, if the fact transaction is an insert transaction, the DLT node may add the fact to the local knowledge graph. In one or more embodiments, if the fact transaction is a delete transaction, then the DLT node may delete the fact from the local knowledge graph. In one or more embodiments, if the fact transaction is an update transaction, the DLT node may delete an old fact corresponding to the fact from the local knowledge graph and add the fact to the local knowledge graph. The fact transaction may also include or otherwise specify the old fact to be deleted during the update. As a result, the local knowledge graph may be incrementally updated based on the fact. Accordingly, each DLT node in the DLT environment may also incrementally update its corresponding local knowledge graph based on the fact and the corresponding fact using the same write order. Therefore, eventual consistency between all of the local knowledge graphs of the DLT nodes may be achieved. Said another way, all local knowledge graphs of all the DLT nodes in the DLT environment may eventually include the same information, that is they are identical, associated with the point-in-time reflected when the fact is used to update the local knowledge graphs. The incremental update may be performed on the local knowledge graph based on the fact via other and/or additional methods without departing from embodiments disclosed herein.

In step 210, a determination is made as to whether the DLT environment includes DLT archive nodes.

In one or more embodiments disclosed herein, the DLT node may include (e.g., in storage) or otherwise have access to a list of the members of the DLT environment. The list may include the DLT node identifiers associated with the DLT nodes of the DLT environment, the DLT archive node identifiers associated with the DLT archive nodes of the DLT environment, a component type indicator (e.g., a tag, flag, or other type of indicator) that specifies whether the corresponding component of the DLT environment is a DLT node or a DLT archive node, and/or other information (e.g., communication information such as network addresses, geographic locations, availability indicators, etc.) associated with the components of the DLT environment. In one or more embodiments, the DLT node may check the list of members of DLT environment to determine whether the DLT environment includes DLT archive nodes. In one or more embodiments, if the list of members of the DLT environment includes DLT archive nodes, then the DLT node may determine that the DLT environment includes DLT archive nodes. In one or more embodiments, if the list of members of the DLT environment does not include DLT archive nodes, then the DLT node may determine that the DLT environment does not include DLT archive nodes. The determination as to whether the DLT environment includes DLT archive nodes may be made via other and/or additional methods without departing from embodiments disclosed herein.

In one or more embodiments disclosed herein, if it is determined that the DLT environment includes DLT archive nodes, then the method may proceed to step 212. In one or more embodiments disclosed herein, if it is determined that the DLT environment does not include DLT archive nodes, then the method may end following step 210.

In step 212, the fact is synced with the DLT archive nodes.

In one or more embodiments disclosed herein, the DLT node may sync the fact with the archive nodes. The DLT node may send a message to the DLT archive nodes. The message may include the fact, the timestamp associated with the fact, and fact metadata associated with the fact. In response to obtaining the message, the DLT archive nodes may also store the fact in an archived immutable log repository. In another embodiment, the DLT node may send the message to one DLT archive node, and that one DLT archive node may forward the message to the other DLT archive nodes. The message may be sent using any appropriate method of data transmission without departing from embodiments disclosed herein. For example, the DLT node may send the one or more messages as one or more packets through one or more network devices that operatively connect the DLT nodes to the one or more DLT archive nodes. As a result, the DLT archive nodes may include an archived immutable log repository that may allow the DLT nodes to clear, delete, or otherwise remove old and/or unused fact entries from their immutable log repositories based on resource capacities associated with the DLT nodes. The fact may be synced with the DLT archive nodes via other and/or additional methods without departing from embodiments disclosed herein.

In one or more embodiments disclosed herein, the method may end following step 212.

Figure 2B:
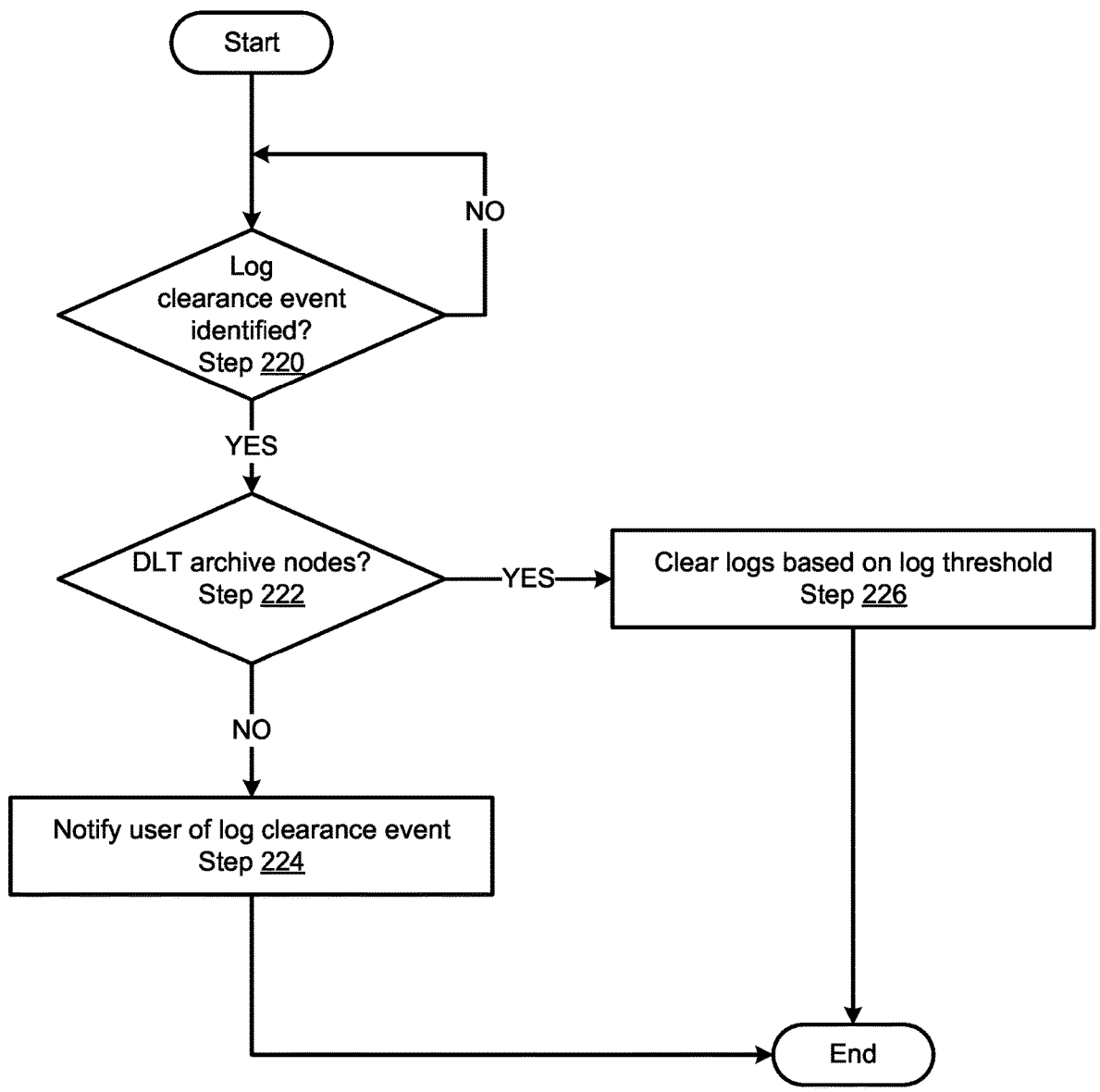
FIG. 2B shows a flowchart of a method for clearing an immutable log repository in accordance with one or more embodiments disclosed herein.

FIG. 2B shows a flowchart of a method for clearing an immutable log repository in accordance with one or more embodiments disclosed herein. The method may be performed by, for example, a DLT node (e.g., 112A, FIG. 1B) of the DLT environment (110, FIG. 1). Other and/or additional components of the system illustrated in FIGS. 1A-1C may perform all, or a portion, of the method of FIG. 2B without departing from embodiments disclosed herein.

While FIG. 2B is illustrated as a series of steps, any of the steps may be omitted, performed in a different order, additional steps may be included, and/or any or all of the steps may be performed in a parallel and/or partially overlapping manner without departing from embodiments disclosed herein.

In step 220, a determination is made as to whether a log clearance event is identified.

In one or more embodiments disclosed herein, the DLT node may identify a log clearance event. In one or more embodiments, the DLT node may monitor the capacity of the storage of the DLT node. In one or more embodiments, if the storage capacity exceeds a capacity limit threshold, then the DLT node may identify the exceeding of the capacity limit threshold as the log clearance event. In one or more embodiments, if the storage capacity does not exceed a capacity limit threshold, then the DLT node may not identify a log clearance event. The capacity limit threshold may specify a maximum allowable storage capacity, which when exceeded, triggers the DLT node to identify a log clearance event. The capacity limit threshold may specify a percentage of the storage capacity or a quantity of data without departing from embodiments disclosed herein.

In another embodiment, the DLT node may monitor the amount of time that a fact entry has been stored in the immutable log repository of the DLT node. In one or more embodiments disclosed herein, if the amount of time a fact has been stored in the immutable log repository exceeds a retention period associated with the immutable log repository, then the DLT node may identify a log clearance event. In one or more embodiments disclosed herein, if the amount of time all facts have been stored in the immutable log repository does not exceed a retention period associated with the immutable log repository, then the DLT node may not identify a log clearance event. In one or more embodiments, the retention period may specify a maximum period of time that a fact entry may be stored in the immutable log repository. The retention period may be any period of time without departing from embodiments disclosed herein.

In still yet another embodiment, the DLT node may include a clearance schedule that specifies points in time to perform a log clearance operation. The DLT node may identify the occurrence of a point in time specified by the clearance schedule as a log clearance event. In one or more embodiments, if the DLT node identifies the occurrence of a point in time specified by the clearance schedule, then the DLT node may identify a log clearance event. In one or more embodiments, if the DLT node does not identify the occurrence of a point in time specified by the clearance schedule, then the DLT node may not identify a log clearance event. The determination as to whether a log clearance event is identified may be made via other and/or additional methods without departing from the embodiments disclosed herein.

In one or more embodiments disclosed herein, if it is determined that a log clearance event is identified, then the method may proceed to step 222. In one or more embodiments disclosed herein, if it is determined that a log clearance event is not identified, then the method may proceed to step 220. In other words, the DLT node may wait until a log clearance event is identified.

In step 222, a determination is made as to whether the DLT environment includes DLT archive nodes.

In one or more embodiments disclosed herein, the DLT node may include (e.g., in storage) or otherwise have access to a list of the members of the DLT environment. The list may include the DLT node identifiers associated with the DLT nodes of the DLT environment, the DLT archive node identifiers associated with the DLT archive nodes of the DLT environment, a component type indicator (e.g., a tag, flag, or other type of indicator) that specifies whether the corresponding component of the DLT environment is a DLT node or a DLT archive node, and/or other information (e.g., communication information such as network addresses, geographic locations, availability indicators, etc.) associated with the components of the DLT environment. In one or more embodiments, the DLT node may check the list of members of DLT environment to determine whether the DLT environment includes DLT archive nodes. In one or more embodiments, if the list of members of the DLT environment includes DLT archive nodes, then the DLT node may determine that the DLT environment includes DLT archive nodes. In one or more embodiments, if the list of members of the DLT environment does not include DLT archive nodes, then the DLT node may determine that the DLT environment does not include DLT archive nodes. The determination as to whether the DLT environment includes DLT archive nodes may be made via other and/or additional methods without departing from embodiments disclosed herein.

In one or more embodiments disclosed herein, if it is determined that the DLT environment includes DLT archive nodes, then the method may proceed to step 226. In one or more embodiments disclosed herein, if it is determined that the DLT environment does not include DLT archive nodes, then the method may proceed to step 226.

In step 224, a user is notified of the log clearance event.

In one or more embodiments disclosed herein, the DLT node may notify a user of the log clearance event. In one embodiments, the DLT node may send a message to a client used by a user indicating that a log clearance event has occurred. The message may be sent using any appropriate method of data transmission without departing from embodiments disclosed herein. For example, the DLT node may send the message as one or more packets through one or more network devices that operatively connect the DLT node to the client. In response to obtaining the message, the client may provide the message to the user through any appropriate type of user interface (e.g., a graphical user interface, a command-line interface, etc.) without departing from embodiments disclosed herein. In response to obtaining the message specifying that a log clearance event has occurred, the user may take any appropriate actions to manually offload fact entries from the immutable log repository of the DLT node and/or local knowledge graph snapshots into other storage to avoid data loss. The user may be notified of the log clearance event via other and/or additional methods without departing from embodiments disclosed herein.

In one or more embodiments disclosed herein, the method may end following step 226.

In step 226, logs are cleared from the immutable log repository based on a log threshold.

In one or more embodiments disclosed herein, the DLT node may clear fact entries, also referred to herein as logs, of the immutable log repository based on one or more local knowledge graph snapshots. In one or more embodiments, the DLT node may periodically generate snapshots of the local knowledge graph according to a user configurable snapshot generation schedule. A snapshot may be generated by creating all the insert transactions and corresponding facts that would be required to recreate the local knowledge graph at the point in time in which the snapshot is generated. The local knowledge graph snapshots may be used to recreate the local knowledge graphs at a point in time. To recreate the local knowledge graph using a local knowledge graph snapshot, the snapshot is then written as a distinct set of transactions that may create the knowledge graph at this point in time and syndicated to the other DLT nodes using the consensus mechanism. To recreate the knowledge graph to the current or any other point in time, the DLT node may simply go back to the last snapshot, recreate the knowledge graph at that point in time, and reapply the subsequent individual fact transactions from the immutable log up to the required point in time. The process may be performed in reverse by taking the next snapshot and running backwards through the fact transactions in the immutable logs, but this time taking their contra transactions, e.g., if insert change to delete and if delete change to insert. Therefore, the immutable log may include a series of individual fact transactions periodically punctuated by a set of local knowledge graph snapshots also stored in the storage of the DLT node.

The DLT node may include multiple local knowledge graph snapshots. As part of the log clearance operation, the DLT node may transfer or otherwise offload one or more of the oldest local knowledge graph snapshots to one or more DLT archive nodes. The DLT node may then delete or otherwise clear the fact entries and corresponding fact transactions from the immutable log that are older the point in time associated with a transferred local knowledge graph snapshot. The local knowledge graph snapshots may be transferred or otherwise offloaded to the one or more DLT archive nodes using any appropriate method of data transmission without departing from embodiments disclosed herein. For example, the DLT node may send the one or more messages as one or more packets through one or more network devices that operatively connect the DLT node to the one or more DLT archive nodes. The logs may be cleared from the immutable log repository based on a log threshold via other and/or additional methods without departing from the embodiments disclosed herein.

In one or more embodiments disclosed herein, the method may end following step 226.

Figure 2C:
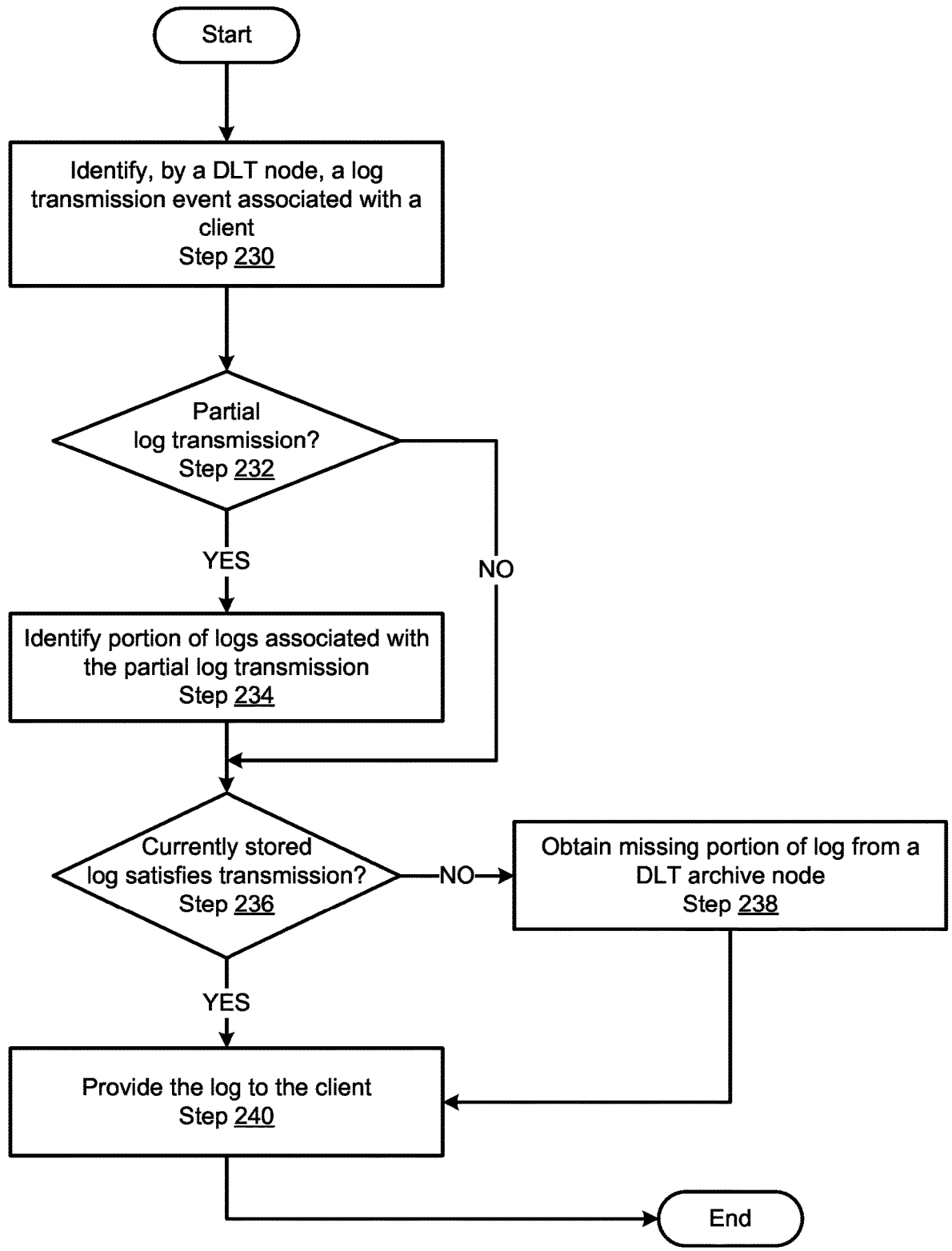
FIG. 2C shows a flowchart of a method for providing an immutable log to a client in accordance with one or more embodiments disclosed herein.

FIG. 2C shows a flowchart of a method for providing an immutable log to a client in accordance with one or more embodiments disclosed herein. The method may be performed by, for example, a DLT node (e.g., 112A, FIG. 1B) of the DLT environment (110, FIG. 1). Other and/or additional components of the system illustrated in FIGS. 1A-1C may perform all, or a portion, of the method of FIG. 2C without departing from embodiments disclosed herein.

While FIG. 2C is illustrated as a series of steps, any of the steps may be omitted, performed in a different order, additional steps may be included, and/or any or all of the steps may be performed in a parallel and/or partially overlapping manner without departing from embodiments disclosed herein.

In step 230, a log transmission event associated with a client is identified by a DLT node.

In one or more embodiments disclosed herein, the DLT node may obtain a message from a client. A user of the client may generate the message to send to the DLT node. The message may include a request for the immutable logs stored in the DLT environment. The message may specify the client associated with the request (e.g., include the client identifier associated with the client) and whether the request is for all, or a portion, of the immutable logs stored in the immutable log repository of the DLT node. If the message is associated with a portion of the immutable log repository, the message may further specify one or more log retrieval criteria. The DLT node may identify the receipt of the message as the log transmission event. The message may be sent using any appropriate method of data transmission without departing from embodiments disclosed herein. For example, the client may send the message as one or more packets through one or more network devices that operatively connect the DLT node to the client.

In another embodiment, the DLT node may send logs to a client based on a log transmission policy associated with the client. The log transmission policy may refer to one or more data structures that include instructions for transmitting logs of the immutable log repository to the client. The log transmission policy may be generated or configured by a user of the client and the client may provide the log transmission policy to the DLT node when upon registering with the client. Although not shown in FIG. 1C, one or more log transmission policies associated with one or more clients may be stored in the storage (e.g., 118, FIG. 1C) of the DLT nodes. The log transmission policy may specify that the client is to receive each new log as it is stored in the immutable log repository. In such a scenario, the DLT node may identify the generation of the fact entry in the immutable log repository of a new log as the log transmission event. In another embodiment, the log transmission policy may specify a log transmission schedule specifying points in time in which to send any new logs to the client that were stored in the immutable log repository after the previous point in time specified by the schedule. In yet another embodiment, the log transmission schedule may specify points in time in which to send the full immutable log repository. In such a scenario, the DLT node may identify the occurrence of a point in time specified by the log transmission schedule as the log transmission event. A log transmission event associated with the client may be identified by the DLT node via other and/or additional methods without departing from embodiments disclosed herein.

In step 232, a determination is made as to whether the transmission event is associated with a partial log transmission.

In one or more embodiments disclosed herein, the DLT node may determine whether the transmission event is associated with a partial log transmission using the log transmission event. In one embodiment, as discussed above, the DLT node may obtain a message that may specify whether the log transmission event is associated with all, or a portion, of the immutable log repository (e.g., the message may include one or more one or more log retrieval criteria, the message may include a partial indicator such as a set partial flag or a partial tag, etc.). In one or more embodiments, if the message obtained from the client specifies that the request is associated with the full immutable log repository, then the DLT node may determine that the log transmission event is associated with a full log transmission. In one or more embodiments, if the message obtained from the client specifies that the request is not associated with the full immutable log repository and is associated with a portion of the immutable log repository, then the DLT node may determine that the log transmission event is associated with a partial log transmission.

In another embodiment, as discussed above, the log transmission event may be associated with a log transmission policy. In such an embodiment, the DLT node may check the log transmission policy to determine whether the log transmission event is associated with a partial log transmission. In one or more embodiments, if the log transmission policy that triggered the log transmission events is associated with a newly stored log or logs stored after a point in time, then the DLT node may determine that the log transmission event is associated with a partial log transmission. In one or more embodiments, if the log transmission policy that triggered the log transmission events is not associated with a newly stored log or logs stored after a point in time and associated with the full immutable log repository, then the DLT node may determine that the log transmission event is not associated with a partial log transmission. The determination as to whether the transmission event is associated with a partial log transmission may be made via other and/or additional methods without departing from embodiments disclosed herein.

In one or more embodiments disclosed herein, if it is determined that the transmission event is associated with a partial log transmission, then the method may proceed to step 234. In one or more embodiments disclosed herein, if it is determined that the transmission event is not associated with a partial log transmission (e.g., associated with a full log transmission), then the method may proceed to step 236.

In step 234, a portion of the logs associated with the partial log transmission event is identified.

In one or more embodiments disclosed herein, the DLT node may identify a portion of the logs included immutable log repository based on the log transmission event. In one embodiment, as discussed above, the DLT node may obtain a message that may include one or more one or more log retrieval criteria. As used herein, a log retrieval criteria may refer to one or more parameters that are associated with a portion of the fact entries, or logs, included in the immutable log repository. The parameters may include, for example, one or more entity identifiers, object identifiers, event identifiers, fact identifiers, and/or properties. The parameters included in the log retrieval criteria may include any combination of entity identifiers, object identifiers, event identifiers, fact identifiers, and/or properties without departing from embodiments disclosed herein. The DLT node may identify all fact entries of the immutable log repository that include the parameters specified by the log retrieval criteria as the portion of the logs associated with the partial log transmission event.

In another embodiment, as discussed above, the log transmission event may be associated with a log transmission policy. In such an embodiment, the DLT node may check the log transmission policy to identify the portion of the logs of the immutable log repository associated with a partial log transmission. In one or more embodiments, if the log transmission policy that triggered the log transmission events is associated with a newly stored log, then the DLT node may identify the newly stored fact entry as the portion of the logs of the immutable log repository associated with the partial transmission. In one or more embodiments, if the log transmission policy that triggered the log transmission events is associated with logs stored after a point in time, then the DLT node may identify all fact entries (i.e., logs) stored after the last point in time specified by the log transmission policy as the portion of the logs associated with the partial log transmission. The portion of the logs associated with the partial log transmission event may be identified via other and/or additional methods without departing from embodiments disclosed herein.

In step 236, a determination is made as to whether the currently stored immutable log repository satisfies the transmission.

In one or more embodiments disclosed herein, the DLT node may determine whether the currently stored immutable log repository satisfies the transmission. The DLT node may include a separate log of log clearance operations that includes a list of log clearance operations and the timestamps associated with the log clearance operations. If the transmission is associated with the full immutable log repository and the log of clearance operations indicates that log clearance operations have been performed, then the DLT node may determine that the currently stored immutable log repository does not satisfy the transmission. If the transmission is associated with the full immutable log repository and the log of clearance operations indicates that no log clearance operations have been performed, then the DLT node may determine that the currently stored immutable log repository satisfies the transmission.

In another embodiment, if the log transmission is a partial log transmission and no log clearance operations have been performed, then the DLT node may determine that the currently immutable log repository satisfies the transmission. However, if log clearance operations have been performed, then the DLT node may send a request to confirm whether the archived immutable log repository stored on the DLT archive node includes logs that satisfy the log retrieval criteria and/or the one or more points in time associated with the portion of the logs identified in step 234. The request may include the log retrieval criteria and/or one or more points in time associated with the portion of the logs identified in step 234. The request and the confirmation may be sent using any appropriate method of data transmission without departing from embodiments disclosed herein. For example, the DLT node may send the request as one or more packets through one or more network devices that operatively connect the DLT node to the DLT archive node.

In one or more embodiments, if the DLT archive node sends a confirmation that the archived immutable log repository includes logs that satisfy the log retrieval criteria and/or the one or more points in time associated with the portion of the logs, then the DLT node may determine that the currently stored immutable log repository does not satisfy the transmission. In one or more embodiments, if the DLT archive node sends a confirmation that the archived immutable log repository does not include logs that satisfy the log retrieval criteria and/or the one or more points in time associated with the portion of the logs, then the DLT node may determine that the currently stored immutable log repository does satisfy the transmission. The determination as to whether the currently stored immutable log repository satisfies the transmission may be made via other and/or additional methods without departing from embodiments disclosed herein.

In one or more embodiments disclosed herein, if it is determined that the currently stored immutable log repository satisfies the transmission, then the method may proceed to step 240. In one or more embodiments disclosed herein, if it is determined that the currently stored immutable log repository does not satisfy the transmission, then the method may proceed to step 238.

In step 238, a missing portion of the log is obtained from a DLT archive node.

In one or more embodiments disclosed herein, the DLT node sends a request for the missing portion of the log to the DLT archive node. The request may include the log retrieval criteria and/or one or more points in time associated with the portion of the logs identified in step 234. In response to obtaining the request, the DLT archive node may provide all fact entries associated with the log retrieval criteria and/or one or more points in time associated with the portion of the logs. The request and the portion of the logs may be sent using any appropriate method of data transmission without departing from embodiments disclosed herein. For example, the DLT node may send the request as one or more packets through one or more network devices that operatively connect the DLT node to the DLT archive node. The DLT archive node may send the portion of the logs as one or more network packets through one or more network devices that operatively connect the DLT archive node to the DLT node.

In one or more embodiments, the DLT node may discard or otherwise delete the portion of the immutable logs obtained from the DLT archive node that are already included in the currently stored immutable log repository in the storage of the DLT node and keep only the missing portion. In another embodiment, the request sent by the DLT node to the DLT archive node may specify the fact entries currently stored on the storage of the DLT node (e.g., include the fact identifiers associated with the currently stored immutable log repository). As a result, the DLT archive node may not send fact entries included in the archived immutable log repository that correspond to the currently stored fact entries in the DLT node. In other words, the DLT archive node may only send the missing portion of the immutable logs associated with the log transmission event. The missing portion of the log may be obtained from the DLT archive node via other and/or additional methods without departing from embodiments disclosed herein.

In step 240, the immutable log is provided to the client.

In one or more embodiments disclosed herein, the DLT node may send the immutable log associated with the log transmission event to the client. The immutable log may be sent to the client using any appropriate method of data transmission without departing from embodiments disclosed herein. For example, the DLT node may send the immutable log as one or more packets through one or more network devices that operatively connect the DLT node to the client. The immutable log may be provided to the client via other and/or additional methods without departing from embodiments disclosed herein.

In one or more embodiments disclosed herein, the method may end following step 240.

Figure 2D:
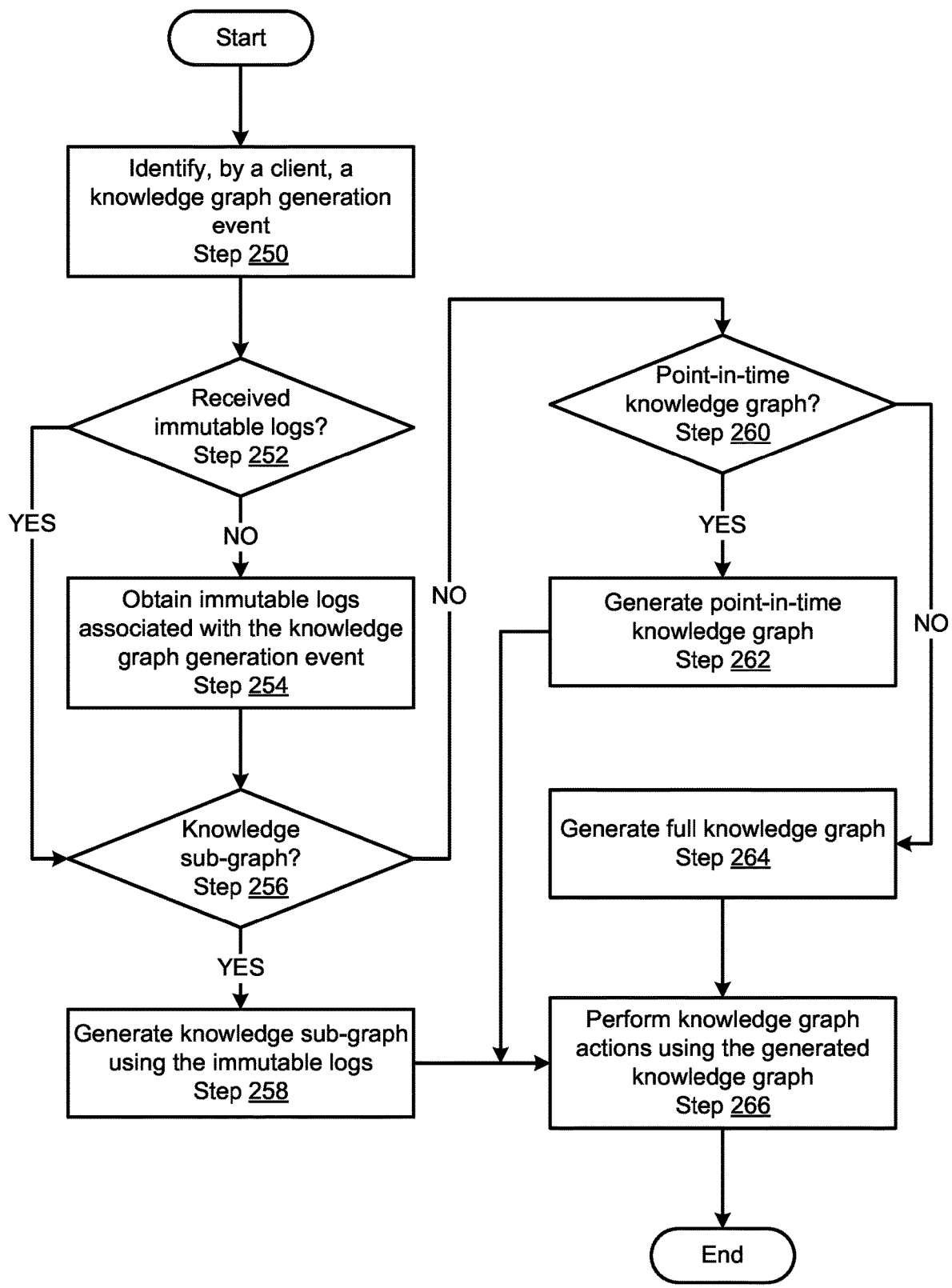
FIG. 2D shows a flowchart of a method for generating a knowledge graph in accordance with one or more embodiments disclosed herein.

FIG. 2D shows a flowchart of a method for generating a knowledge graph in accordance with one or more embodiments disclosed herein. The method may be performed by, for example, a client (e.g., 100A, FIG. 1A) of the clients (100, FIG. 1A). Other and/or components of the system illustrated in FIGS. 1A-1C may perform all, or a portion, of the method of FIG. 2D without departing from embodiments disclosed herein.

While FIG. 2D is illustrated as a series of steps, any of the steps may be omitted, performed in a different order, additional steps may be included, and/or any or all of the steps may be performed in a parallel and/or partially overlapping manner without departing from embodiments disclosed herein.

In step 250, a knowledge graph generation event is identified by a client.

In one or more embodiments disclosed herein, the user may request the client generate a knowledge graph through any appropriate type of user interface (e.g., graphical user interface, command-line interface, etc.). The user may submit inputs (e.g., a command, click a box, enter information through an input device, etc.) that specify whether the user desires a full knowledge graph, a partial knowledge graph, or a point in time knowledge graph. The client may identify the receipt of the request from the user as a knowledge graph generation event.

In other embodiments, as discussed above in FIG. 2C, a DLT node may send immutable logs to the client based on a log transmission policy associated with the client. The immutable log may be sent to the client using any appropriate method of data transmission without departing from embodiments disclosed herein. For example, the DLT node may send the immutable log as one or more packets through one or more network devices that operatively connect the DLT node to the client. In such embodiments, the client may identify the receipt of the immutable logs from the client as the knowledge graph generation event.

In yet another embodiment, the client may automatically identify a knowledge graph generation event to perform processing on the knowledge graph. For example, the client may be instructed by a user or be configured to periodically compare two knowledge graphs (e.g., a current knowledge graph and a knowledge graph associated with a different point in time, compare one knowledge sub-graph with another knowledge sub-graph, etc.) and needs to generate one or both of the knowledge graphs. The client may automatically identify a knowledge graph generation event in such scenarios. A knowledge graph generation event may be identified by the client via other and/or additional methods without departing from embodiments disclosed herein.

In step 252, a determination is made as to whether the immutable logs associated with the knowledge graph generation event have been received.

In one or more embodiments disclosed herein, the client may determine whether the immutable logs associated with the knowledge graph generation event have been received based on the knowledge graph generation event. As discussed above in step 250, the knowledge graph generation event may include obtaining a user request for the generation of a knowledge graph or obtaining immutable logs based on a log transmission policy. In one or more embodiments, if the knowledge graph generation event included obtaining a user request, then the client may determine that the immutable logs associated with the knowledge graph generation event have not been received by the client. In one or more embodiments, if the knowledge graph generation event included obtaining immutable logs associated with the knowledge generation event from a DLT node, then the client may determine that the immutable logs associated with the knowledge graph generation event have been received by the client. The determination as to whether the immutable logs associated with the knowledge graph generation event have been received may be made via other and/or additional methods without departing from embodiments disclosed herein.

In one or more embodiments disclosed herein, if it is determined that the immutable logs have been received, then the method may proceed to step 258. In one or more embodiments disclosed herein, if it is determined that the immutable logs have not been received, then the method may proceed to step 254.

In step 254, immutable logs associated with the knowledge graph generation event are obtained from a DLT node.

In one or more embodiments disclosed herein, the client may send a message to a DLT node of the DLT environment. A user of the client may generate the message to send to the DLT node. The client may send the message to any DLT node in the DLT environment as each DLT node may include a copy of the immutable log repository that includes all or a portion of the immutable logs or and/or otherwise may have access to a copy of the immutable log repository (e.g., an archived immutable log repository on a DLT archive node that includes all immutable logs stored in the DLT environment). For example, the client may send the message to the nearest DLT node. The nearest DLT node may refer to the nearest DLT node geographically to the client and/or the DLT node associated with the least amount of network hops to the client.

The message may include a request for the immutable logs stored in the DLT environment. The message may specify the client associated with the request (e.g., include the client identifier associated with the client) and whether the request is for all, or a portion, of the immutable logs stored in the immutable log repository of the DLT node. If the message is associated with a portion of the immutable log repository, the message may further specify one or more log retrieval criteria. The message may be sent using any appropriate method of data transmission without departing from embodiments disclosed herein. For example, the client may send the message as one or more packets through one or more network devices that operatively connect the DLT node to the client. In response to obtaining the message, the DLT node may provide the requested immutable logs to the client via the methods discussed above in FIG. 2C. The immutable logs associated with the knowledge graph generation event may be obtained from the DLT node via other and/or additional methods without departing from embodiments disclosed herein.

In step 256, a determination is made as to whether the knowledge graph generation event is associated with a knowledge sub-graph.

As discussed above in step 250, in one embodiment, the user may submit a knowledge graph generation request. In addition to the request, the user may submit one or more inputs (e.g., a command, click a box, enter information through an input device such as a keyboard or a touchscreen, etc.) that specify whether the user desires a full knowledge graph, a partial knowledge graph, or a point in time knowledge graph. In such scenarios, the client may check the inputs provided by the user determine the type of knowledge graph to generate using the obtained immutable logs. In one or more embodiments, if the user input is associated with a knowledge sub-graph, then the client may determine that the knowledge graph generation event is associated with a knowledge sub-graph. In one or more embodiments, if the user input is not associated with a knowledge sub-graph, then the client may determine that the knowledge graph generation event is not associated with a knowledge sub-graph.

In another embodiment, as also discussed above in step 250, the knowledge graph generation event may include obtaining immutable logs from a DLT node. In addition to sending the immutable logs, the DLT node may also indicate whether the knowledge graph associated with the immutable logs is to be a full knowledge graph, a knowledge sub-graph, or a point-in-time knowledge graph. To indicate the knowledge graph type, the DLT node may provide a knowledge graph type indicator. The knowledge graph type indicator may include a knowledge graph type identifier, a set flag, one or more log retrieval criteria, or other parameter that specifies the type of knowledge graph that is to be generated. In one or more embodiments, if the client obtains a knowledge graph type indicator associated with a knowledge sub-graph, then the client may determine that the knowledge graph generation event is associated with a knowledge sub-graph. In one or more embodiments, if the client obtains a knowledge graph type indicator that is not associated with a knowledge sub-graph, then the client may determine that the knowledge graph generation event is not associated with a knowledge sub-graph. The determination as to whether the knowledge graph generation event is associated with a knowledge sub-graph may be determined via other and/or additional methods without departing from embodiments disclosed herein.

In one or more embodiments disclosed herein, if it is determined that the knowledge graph generation event is associated with a knowledge sub-graph, then the method may proceed to step 254. In one or more embodiments disclosed herein, if it is determined that the knowledge graph generation event is not associated with a knowledge sub-graph, then the method may proceed to step 260 to determine whether the knowledge graph generation event is associated with a point-in-time knowledge graph or a full knowledge graph.

In step 258, a knowledge sub-graph is generated using the immutable logs.

In one or more embodiments disclosed herein, the client may use the obtained immutable logs to generate the knowledge sub-graph. As used herein, a knowledge sub-graph may refer to a knowledge graph the only includes a portion of the facts associated with a certain event, entity, and/or object. In one embodiment, the obtained immutable logs may include the full immutable logs associated with all facts stored in the immutable log repository. In such a scenario, the client may use one or more log retrieval criteria supplied by the user during the submission of the knowledge graph generation event or obtained with the immutable logs to identify a portion of the full immutable logs to use to generate the knowledge sub-graph. In another embodiment, the obtained logs may include a portion of the immutable log repository sent as a partial log transmission. The client may use any appropriate knowledge graph generation algorithm that generates a knowledge graph using immutable logs to generate the knowledge sub-graph without departing from embodiments disclosed herein.

In another embodiment, the knowledge sub-graph may be generated using an existing knowledge graph. In one or more embodiments, the existing knowledge graph may be generated using a snapshot of a knowledge graph. The snapshot may be a snapshot of local knowledge graph of a DLT node at a point in time. The snapshot may also be obtained from the DLT node or a DLT archive node. The knowledge sub-graph may be generated by removing all facts from the existing knowledge graph that do not satisfy that log retrieval criteria and perform the transactions in the immutable logs that that occurred after the point in time of the existing knowledge graph that satisfy the log retrieval criteria. The knowledge sub-graph may be generated via other and/or additional methods without departing from embodiments disclosed herein.

In one or more embodiments disclosed herein, the method may proceed to step 266 following step 258.

In step 260, a determination is made as to whether the knowledge graph generation event is associated with a point-in-time knowledge graph.

As discussed above in step 250, in one embodiment, the user may submit a knowledge graph generation request. In addition to the request, the user may submit one or more inputs (e.g., a command, click a box, enter information through an input device such as a keyboard or a touchscreen, etc.) that specify whether the user desires a full knowledge graph, a partial knowledge graph, or a point in time knowledge graph. In such scenarios, the client may check the inputs provided by the user determine the type of knowledge graph to generate using the obtained immutable logs. In one or more embodiments, if the user input is associated with a point-in-time knowledge graph, then the client may determine that the knowledge graph generation event is associated with a point-in-time knowledge graph. In one or more embodiments, if the user input is not associated with a point-in-time knowledge graph, then the client may determine that the knowledge graph generation event is not associated with a point-in-time knowledge graph.

In another embodiment, as also discussed above in step 250, the knowledge graph generation event may include obtaining immutable logs from a DLT node. In addition to sending the immutable logs, the DLT node may also indicate whether the knowledge graph associated with the immutable logs is to be a full knowledge graph, a knowledge sub-graph, or a point-in-time knowledge graph. To indicate the knowledge graph type, the DLT node may provide a knowledge graph type indicator. The knowledge graph type indicator may include a knowledge graph type identifier, a set flag, one or more log retrieval criteria, or other parameter that specifies the type of knowledge graph that is to be generated.

In one or more embodiments, if the client obtains a knowledge graph type indicator associated with a point-in-time knowledge graph, then the client may determine that the knowledge graph generation event is associated with a point-in-time knowledge graph. In one or more embodiments, if the client obtains a knowledge graph type indicator that is not associated with point-in-time knowledge graph, then the client may determine that the knowledge graph generation event is not associated with a point-in-time knowledge graph. The determination as to whether the knowledge graph generation event is associated with a point-in-time knowledge graph may be determined via other and/or additional methods without departing from embodiments disclosed herein.

In one or more embodiments disclosed herein, if it is determined that the knowledge graph generation event is associated with a point-in-time knowledge graph, then the method may proceed to step 262. In one or more embodiments disclosed herein, if it is determined that the knowledge graph generation event is not associated with a point-in-time knowledge graph, and is therefore associated with a full knowledge graph, then the method may proceed to step 264.

In step 262, a point-in-time knowledge graph is generated.

In one or more embodiments disclosed herein, the client may use the obtained immutable logs to generate the point-in-time knowledge graph. As used herein, a point-in-time knowledge graph may refer to a knowledge graph that is associated with a particular point-in-time that is not the current time. Said another way, the point-in-time knowledge graph may represent the state of the domain at a particular point in time. The obtained immutable logs may be the full immutable logs associated with all facts stored in the immutable log repository or a portion of the immutable logs that existed at the point in time associated with the point-in-time knowledge graph. In such a scenario, the client may use a point in time included with the obtained immutable logs or supplied by the user during the submission of the knowledge graph generation event or to identify a portion of the full immutable logs to generate the point-in-time knowledge graph as the immutable log repository existed at that point in time.

In another embodiment, the may use the full immutable logs to step back or walk forward an existing knowledge graph to generate the point-in-time knowledge graph. In one or more embodiments, the existing knowledge graph may be generated using a snapshot of a knowledge graph. The snapshot may be a snapshot of local knowledge graph of a DLT node at a point in time. The snapshot may also be obtained from the DLT node or a DLT archive node. In such a scenario, the client may: (i) add, update, and/or delete facts associated with new transactions of the immutable logs to an existing knowledge graph that is associated with a prior to the point in time compared with the point-in-time knowledge graph using the immutable logs, or (ii) the client may reverse the transactions (e.g., add, update, and/or delete) of the immutable logs from a knowledge that is associated with a subsequent point in time that occurred after the point in time associated with the point-in-time knowledge graph until the point in time associated with the point-in-time knowledge graph is reached. The client may use any appropriate knowledge graph generation algorithm that generates a knowledge graph using immutable logs to generate the point-in-time knowledge graph without departing from embodiments disclosed herein. The point-in-time knowledge graph may be generated via other and/or additional methods without departing from embodiments disclosed herein.

In one or more embodiments disclosed herein, the method may proceed to step 266 following step 262.

In step 264, a full knowledge graph is generated.

In one or more embodiments disclosed herein, the client may use the obtained immutable logs to generate the full knowledge graph. As used herein, a full knowledge graph may refer to a knowledge graph the only includes all of the facts included in a current immutable log repository. In one embodiment, the obtained immutable logs may include the full immutable logs associated with all facts stored in the immutable log repository. The client may use any appropriate knowledge graph generation algorithm that generates a knowledge graph using immutable logs to generate the full knowledge graph without departing from embodiments disclosed herein. The full knowledge graph may be generated via other and/or additional methods without departing from embodiments disclosed herein.

In step 266, knowledge graph actions are performed using the knowledge graph.

In one or more embodiments disclosed herein, the client may perform one or more knowledge graph actions using the generated knowledge graph. The knowledge graph actions may include, for example, providing or otherwise displaying the knowledge graph to a user, obtaining verification information associated with the knowledge graph from the user, updating the knowledge graph using the verification information (e.g., removing incorrect facts, modifying incorrect facts, adding missed facts, etc.), performing additional processing on the knowledge graph, sending the knowledge graph to another computing device for further processing, etc. The knowledge graph actions may include other and/or additional actions associated with the knowledge graph. The knowledge graph actions may be performed via other and/or additional methods without departing from embodiments disclosed herein.

In one or more embodiments disclosed herein, the method may end following step 266.

In one or more embodiments disclosed herein, the method of FIG. 2D may be performed by a DLT node and the DLT node may provide the new knowledge graph to the client associated with the knowledge graph generation event.

Figure 3:
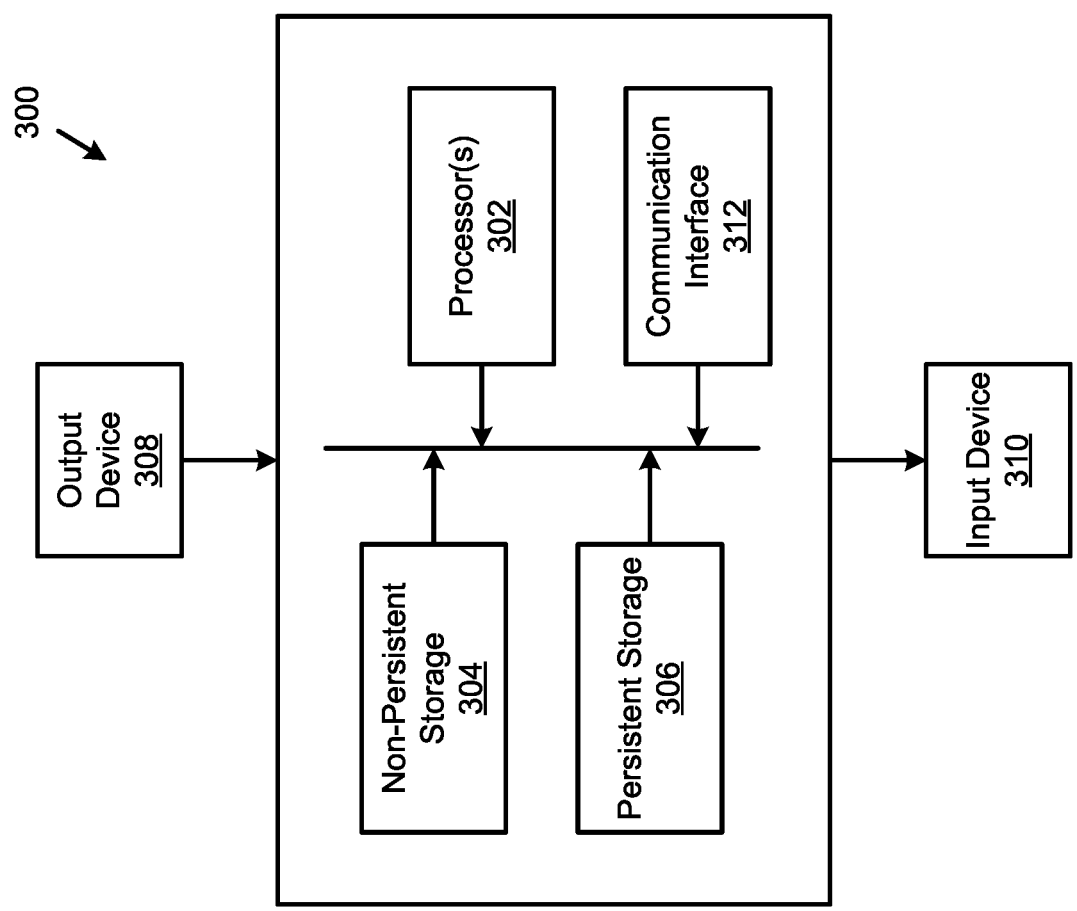
FIG. 3 shows a diagram of a computing device in accordance with one or more embodiments disclosed herein.

As discussed above, embodiments disclosed herein may be implemented using computing devices. FIG. 3 shows a diagram of a computing device in accordance with one or more embodiments disclosed herein. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one or more embodiments, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one or more embodiments, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

As used herein, an entity that is programmed to or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

One or more embodiments disclosed herein may be implemented using instructions executed by one or more processors of the data management device. Further, such instructions may correspond to computer readable instructions that are stored on one or more non-transitory computer readable mediums. In one or more embodiments, any non-volatile storage (not shown) and/or memory (not shown) of a computing device or system of computing devices may be considered, in whole or in part, as non-transitory computer readable mediums, which may store software and/or firmware. Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein. The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The problems discussed above should be understood as being examples of problems solved by embodiments disclosed herein and the embodiments disclosed herein should not be limited to solving the same/similar problems. The disclosed embodiments are broadly applicable to address a range of problems beyond those discussed herein.

While the embodiments disclosed herein have been described with respect to a limited number of embodiments, those skilled in the art, having benefit of this disclosure, will appreciate that other embodiments can be devised which do not depart from the scope of the technology as disclosed herein. Accordingly, the scope of the embodiments disclosed herein should be limited only by the attached claims.

What is claimed is:

1. A method for managing knowledge graphs in a distributed system, comprising:
   obtaining, by a first distributed ledger technology (DLT) node of a plurality of DLT nodes in a DLT environment, a fact and a fact transaction for the fact from a source node;
   initiating, by the first DLT node, fact consensus by the plurality of DLT nodes, wherein initiating the fact consensus comprises sending consensus requests by the first DLT node to other DLT nodes of the plurality of DLT nodes;
   making, by the first DLT node and after sending the consensus requests, a determination that a fact consensus associated with the fact is reached;
   in response to the determination:
      saving, by the first DLT node, the fact and the fact transaction in a first immutable log in a storage associated with the first DLT node in a write order, wherein a client generates a first new knowledge graph using the immutable log;
      saving, by a second DLT node of the plurality of DLT nodes, the fact and the fact transaction in a second immutable log in a storage associated with the second DLT node in the write order, wherein the first immutable log matches the second immutable log;
      performing an incremental update of a first local knowledge graph associated with the first DLT node using the fact and the immutable log, wherein the first local knowledge graph is part of a distributed semantic graph;
      performing an incremental update of a second local knowledge graph associated with the second DLT node using the fact and the second immutable log, wherein the second local knowledge graph is part of the distributed semantic graph; and
      syncing, by the first DLT node, the fact with a DLT archive node that comprises an archive copy of the first immutable log.

2. The method of claim 1, wherein the first immutable log further comprises a timestamp associated with the fact.

3. The method of claim 1, wherein the archive copy of the first immutable log comprises more facts than the first immutable log.

4. The method of claim 1, further comprising:
   obtaining, by a second DLT node of the plurality of DLT nodes, a second fact from a second source node, wherein the second fact is obtained in parallel with the fact;
   initiating, by the second DLT node, second fact consensus by the plurality of DLT nodes;
   making, by the second DLT node, a determination that a fact consensus associated with the second fact is reached;
   in response to the determination:
      saving, by the second DLT node, the second fact in a second immutable log in a storage associated with the second DLT node, wherein a second client generates a second new knowledge graph using the second immutable log; and
      syncing, by the second DLT node, the second fact with a second DLT archive node that comprises an archive copy of the second immutable log.

5. The method of claim 1, wherein the fact consensus comprises ensuring a write order fidelity associated with the fact.

6. A system for managing knowledge graphs comprises:
   a distributed ledger technology (DLT) environment; and
   a first DLT node of a plurality of DLT nodes included in the DLT environment, comprising a processor and memory, and configured to:
      obtain a fact and a fact transaction for the fact from a source node;
      initiate fact consensus by the plurality of DLT nodes wherein initiating the fact consensus comprises sending consensus requests by the first DLT node to other DLT nodes of the plurality of DLT nodes;
      make, and after sending the consensus requests, a determination that a fact consensus associated with the fact is reached;
      in response to the determination:
         save the fact and the fact transaction in a first immutable log in a storage associated with the first DLT node in a write order, wherein a client generates a new knowledge graph using the immutable log;
         save, by a second DLT node of the plurality of DLT nodes, the fact and the fact transaction in a second immutable log in a storage associated with the second DLT node in the write order, wherein the first immutable log matches the second immutable log;
         perform an incremental update of a first local knowledge graph associated with the first DLT node using the fact and the immutable log, wherein the first local knowledge graph is part of a distributed semantic graph;
         perform an incremental update of a second local knowledge graph associated with the second DLT node using the fact and the second immutable log, wherein the second local knowledge graph is part of the distributed semantic graph; and
         sync the fact with a DLT archive node that comprises an archive copy of the first immutable log.

7. The system of claim 6, wherein the first immutable log further comprises a timestamp associated with the fact.

8. The system of claim 6, wherein the archive copy of the first immutable log comprises more facts than the first immutable log.

9. A non-transitory computer readable medium comprising computer readable program code, which when executed by a computer processor enables the computer processor to perform a method for managing knowledge graphs, the method comprising:
   obtaining, by a first distributed ledger technology (DLT) node of a plurality of DLT nodes in a DLT environment, a fact and a fact transaction for the fact from a source node;
   initiating, by the first DLT node, fact consensus by the plurality of DLT nodes, wherein initiating the fact consensus comprises sending consensus requests by the first DLT node to other DLT nodes of the plurality of DLT nodes;
   making, by the first DLT node and after sending the consensus requests, a determination that a fact consensus associated with the fact is reached;
   in response to the determination:
      saving, by the first DLT node, the fact and the fact transaction in a first immutable log in a storage associated with the first DLT node in a write order, wherein a client generates a first new knowledge graph using the immutable log;
      saving, by a second DLT node of the plurality of DLT nodes, the fact and the fact transaction in a second immutable log in a storage associated with the second DLT node in the write order, wherein the first immutable log matches the second immutable log;
      performing an incremental update of a first local knowledge graph associated with the first DLT node using the fact and the immutable log, wherein the first local knowledge graph is part of a distributed semantic graph;
      performing an incremental update of a second local knowledge graph associated with the second DLT node using the fact and the second immutable log, wherein the second local knowledge graph is part of the distributed semantic graph; and
      syncing, by the first DLT node, the fact with a DLT archive node that comprises an archive copy of the first immutable log.

10. The non-transitory computer readable medium of claim 9, wherein the first immutable log further comprises a timestamp associated with the fact.

11. The non-transitory computer readable medium of claim 9, wherein the archive copy of the first immutable log comprises more facts than the first immutable log.

* * * * *